US012704666B2

(12) United States Patent
Vercesi et al.

(10) Patent No.: US 12,704,666 B2
(45) Date of Patent: Aug. 11, 2026

(54) MICRO-ELECTROMECHANICAL OPTICAL SHUTTER WITH TRANSLATING SHIELDING STRUCTURES AND RELATED MANUFACTURING PROCESS

(71) Applicant: STMICROELECTRONICS S.r.l., Agrate Brianza (IT)

(72) Inventors: Federico Vercesi, Milan (IT); Nicolo' Boni, Mountain View, CA (US); Fabrizio Cerini, Magenta (IT); Luca Guerinoni, Alzano Lombardo (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 810 days.

(21) Appl. No.: 18/058,147

(22) Filed: Nov. 22, 2022

(65) Prior Publication Data

US 2023/0168415 A1 Jun. 1, 2023

(30) Foreign Application Priority Data

Nov. 30, 2021 (IT) ........................ 102021000030275

(51) Int. Cl.
*G02B 5/00* (2006.01)
*H02N 1/00* (2006.01)
*H02N 2/02* (2006.01)

(52) U.S. Cl.
CPC ............. *G02B 5/005* (2013.01); *H02N 1/006* (2013.01); *H02N 2/028* (2013.01)

(58) Field of Classification Search
CPC ........ G02B 5/005; G02B 26/02; H02N 1/006; H02N 2/028; B81B 3/0021; B81B 3/0064; B81B 3/0083; B81B 7/02; B81C 1/0015

(Continued)

(56) References Cited

U.S. PATENT DOCUMENTS 5,993,079 A 11/1999 O'Brien et al.
10,523,135 B2 * 12/2019 Ng ........................ H04N 23/55

(Continued)

FOREIGN PATENT DOCUMENTS

CN 104662473 A 5/2015
CN 113620232 A 11/2021

(Continued)

OTHER PUBLICATIONS

Syms et al., "Sliding-blade MEMS iris and variable optical attenuator," *Journal of Micromechanics and Microengineering 14*(12), Sep. 14, 2004. (12 pages).

(Continued)

*Primary Examiner* — Wyatt A Stoffa
*Assistant Examiner* — Rahman Abdur
(74) *Attorney, Agent, or Firm* — Seed Intellectual Property Law Group LLP

(57) ABSTRACT

A MEMS shutter including: a semiconductor substrate traversed by an aperture; a first semiconductor layer and a second semiconductor layer, which form a supporting structure fixed to the substrate; a plurality of deformable structures, each of which is formed by a corresponding portion of at least one between the first and second semiconductor layers; a plurality of actuators; a plurality of shielding structures, each of which is formed by a corresponding portion of at least one between the first and second semiconductor layers, the shielding structures being arranged angularly around the underlying aperture so as to provide shielding of the aperture, each shielding structure being further coupled to the supporting structure via a deformable structure. Each actuator may be controlled so as to translate a corresponding shielding structure between a first position and a second position, thus varying shielding of the aperture; the first and second positions of the shielding structures are (Continued)

such that, in at least one operating condition, pairs of adjacent shielding structures at least partially overlap one another.

22 Claims, 30 Drawing Sheets

(58) Field of Classification Search
USPC .......................................................... 359/230
See application file for complete search history.

(56) References Cited

U.S. PATENT DOCUMENTS

2007/0223080 A1 9/2007 Hagood et al.
2008/0199177 A1 8/2008 Ide
2015/0037024 A1* 2/2015 Zhou ........................ G03B 9/06 396/510
2017/0269355 A1* 9/2017 Chiaretti .............. G02B 6/3508
2019/0377174 A1 12/2019 Mihailovich et al.
2020/0156929 A1* 5/2020 Paci ................... H10N 30/2047
2021/0261403 A1 8/2021 Gattere et al.
2023/0168488 A1 6/2023 Vercesi et al.

FOREIGN PATENT DOCUMENTS

CN 220976584 U 5/2024
DE 102019127271 A1 4/2021
EP 3872451 A1 9/2021
SU 1631502 A1 2/1991

OTHER PUBLICATIONS

Syms, "BSOI MOEMS," Proc. SPIE 5719, MOEMS and Miniaturized Systems V, Jan. 22, 2005. (13 pages).
Zhou et al., "Microelectromechanical-systems-driven two-layer rotary-blade-based adjustable iris diaphragm," *Optics Letters 37*(10):1745-1747, May 15, 2022.

* cited by examiner 27A
29
R'
333
335
345
348
378
381
59
H
X
Y
Z

XVIB
481
433
481"
R'
446
448"
448
481'
499
M1
M2
XVIB
27A
R'
Z
TR'

481
481"
433
442
446
448
479
480
440
448"
481'
446
499
448'
R'
Z 8
506
504
7
WP3
WP2
510
WP3
7
500
2

515

WP4
WP5

MICRO-ELECTROMECHANICAL OPTICAL SHUTTER WITH TRANSLATING SHIELDING STRUCTURES AND RELATED MANUFACTURING PROCESS

BACKGROUND

Technical Field

The present disclosure relates to a MEMS (Micro-ElectroMechanical System) optical shutter including translating shielding structures, as well as to the related manufacturing process.

Description of the Related Art

As is known, mobile phones are today available equipped with improved camera modules, which guarantee levels of performance by now comparable with those of professional cameras. Such modules include sensors that are progressively larger and have progressively higher performance; however, it is known how only a few solutions make it possible to implement a typical characteristic of professional cameras: a variable optical aperture.

For instance, US 2019/0377174 describes a MEMS optical shutter including a pinhole, a blade, and an actuator designed to move the blade laterally with respect to the pinhole. This solution, however, has available only a small number of degrees of freedom for adjustment of the optical aperture; in particular, adjustment of the optical aperture is limited to a portion of the perimeter of the optical aperture.

BRIEF SUMMARY

The present disclosure is thus directed to provide a solution that will overcome at least in part the drawbacks of the prior art.

The present disclosure is directed to a MEMS optical shutter and a related manufacturing process. For example, the present disclosure is directed to a device that includes a micro-electromechanical shutter having a substrate; an aperture through the substrate; a plurality of cantilever structures coupled to the substrate around the aperture; a plurality of first shielding regions coupled to first ones of the plurality of cantilever structures; and a plurality of second shielding regions coupled to second ones of the plurality of cantilever structures, the plurality of second shielding regions being closer to the aperture than the plurality of second shielding regions. The shutter includes adjacent ones of the plurality of first shielding regions being spaced from each other by one of the plurality of second shielding regions. A plurality of first spring structures are between the plurality of first shielding regions and the corresponding cantilever structure and a plurality of second spring structures between the plurality of second shielding regions and the corresponding cantilever structure.

BRIEF DESCRIPTION OF THE SEVERAL VIEWS OF THE DRAWINGS

For a better understanding of the present disclosure, embodiments thereof are now described, purely by way of non-limiting example, with reference to the attached drawings, wherein.

DETAILED DESCRIPTION

Figure 1A:
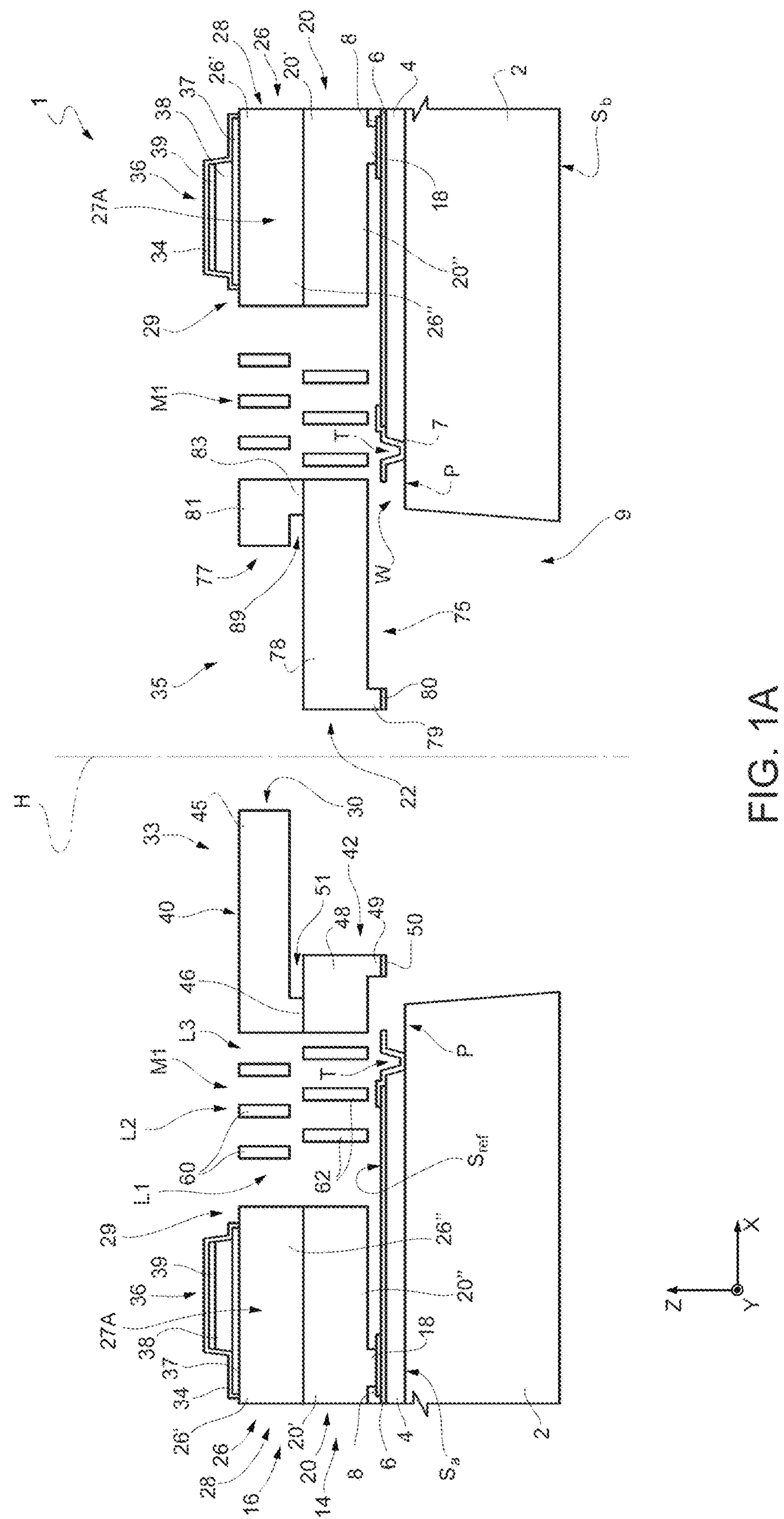
FIGS. 1A-1B are schematic cross-sectional views of MEMS shutters, FIG. 1B being taken along a line of section IB-IB represented in FIG. 2.

FIG. 1A shows a MEMS shutter 1, which comprises a substrate 2 of semiconductor material (for example, silicon) and a first dielectric region 4, which is arranged on the substrate 2 and is formed by thermal oxide.

In particular, the substrate 2 is delimited by a top surface $S_a$ and a bottom surface $S_b$, which are parallel to a plane XY of an orthogonal reference system XYZ. The first dielectric region 4 extends on the top surface $S_a$ and laterally delimits a window W, which leaves exposed a central portion of the top surface $S_a$; in other words, the first dielectric region 4 extends on a peripheral portion of the top surface $S_a$.

The MEMS shutter 1 further comprises a second dielectric region 6, which is made, for example, of aluminum oxide (alumina) and extends on a peripheral portion of the first dielectric region 4, leaving exposed an inner portion of the first dielectric region 4, which laterally delimits the aforementioned window W.

A main aperture 9 extends through the substrate 2 starting from the bottom surface $S_b$ and giving out onto the central portion of the top surface $S_a$. Sidewalls of the substrate may be tapered outward from the bottom surface to the top surface at the main aperture 9. In what follows it is assumed, for simplicity of description and without this implying any loss of generality, that the main aperture 9 has its axis of symmetry that coincides with an axis of symmetry H of the MEMS shutter 1, parallel to the axis Z. Furthermore, to a first approximation, the main aperture 9 has, for example, a frustoconical shape or a frustopyramidal shape with polygonal base, with the minor base that lies in the plane of the bottom surface $S_b$.

The window W communicates with the underlying main aperture 9 and is delimited at the bottom by a wall P, which is formed by a part of the substrate 2 that laterally delimits the top part of the main aperture 9 and has a plane and hollow shape. The wall P lies in the plane of the top surface $S_a$.

The MEMS shutter 1 further comprises a conductive layer 7, which has a closed shape in top plan view (for example, polygonal or circular) so as to surround the main aperture 9.

In particular, the conductive layer 7 has an approximately U-shaped cross-section so as to delimit a trench T.

An outer portion of the conductive layer 7 coats laterally and at the top the aforementioned inner portion of the first dielectric region 4 and further coats at the top a portion of the second dielectric region 6 facing the axis of symmetry H. A bottom portion of the conductive layer 7 coats an outer portion of the wall P; an inner portion of the conductive layer 7 extends in cantilever fashion from the bottom portion so as to overlie, at a distance, part of an inner portion of the wall P.

The MEMS shutter 1 further comprises a plurality of anchorage regions (two of which are illustrated in FIG. 1A and designated by 8), which are made of polysilicon and extend on the second dielectric region 6. In particular, the anchorage regions 8 are arranged at a lateral distance from the conductive layer 7 and are arranged on the outside of the latter.

Figure 1B:
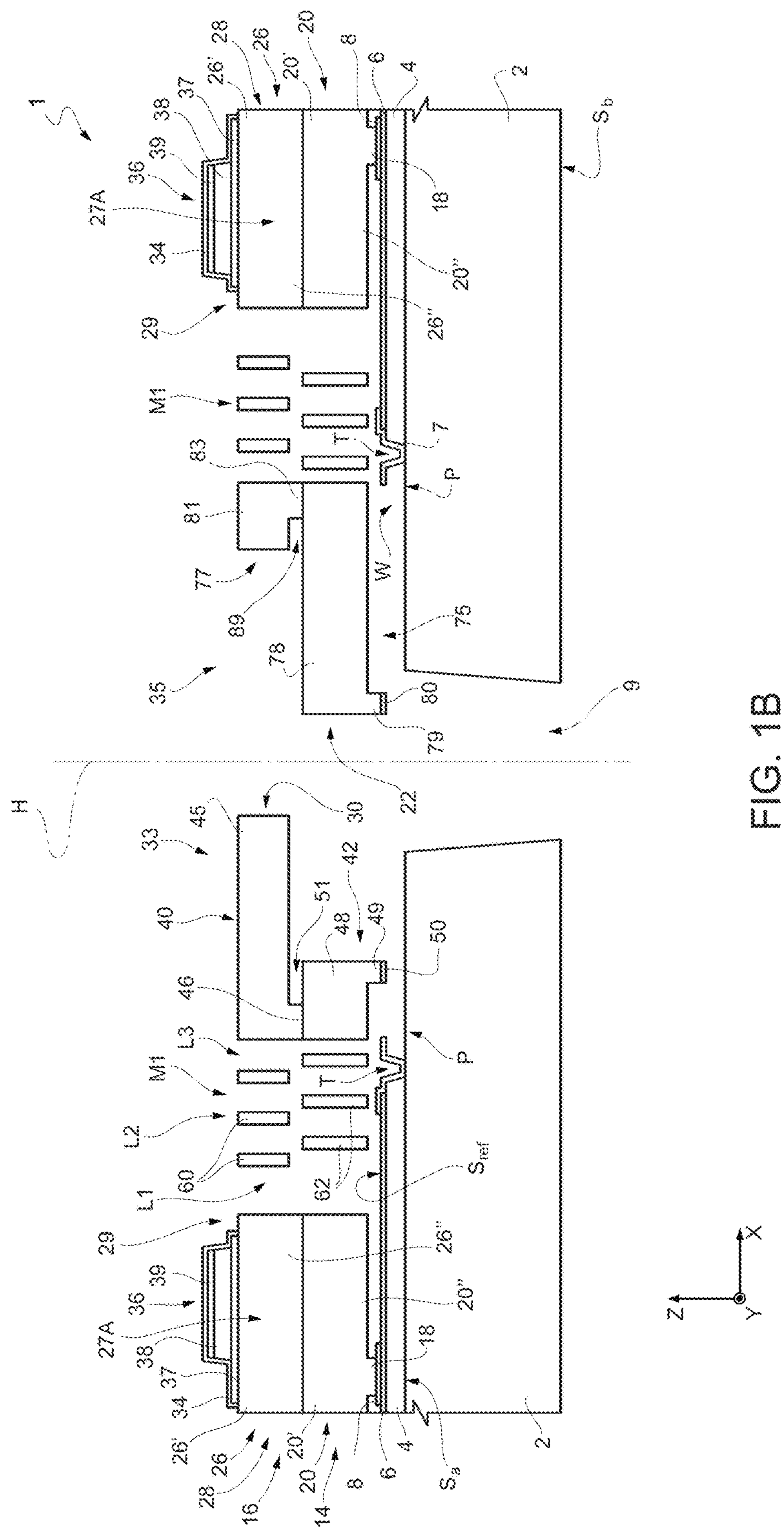
Figure 2:
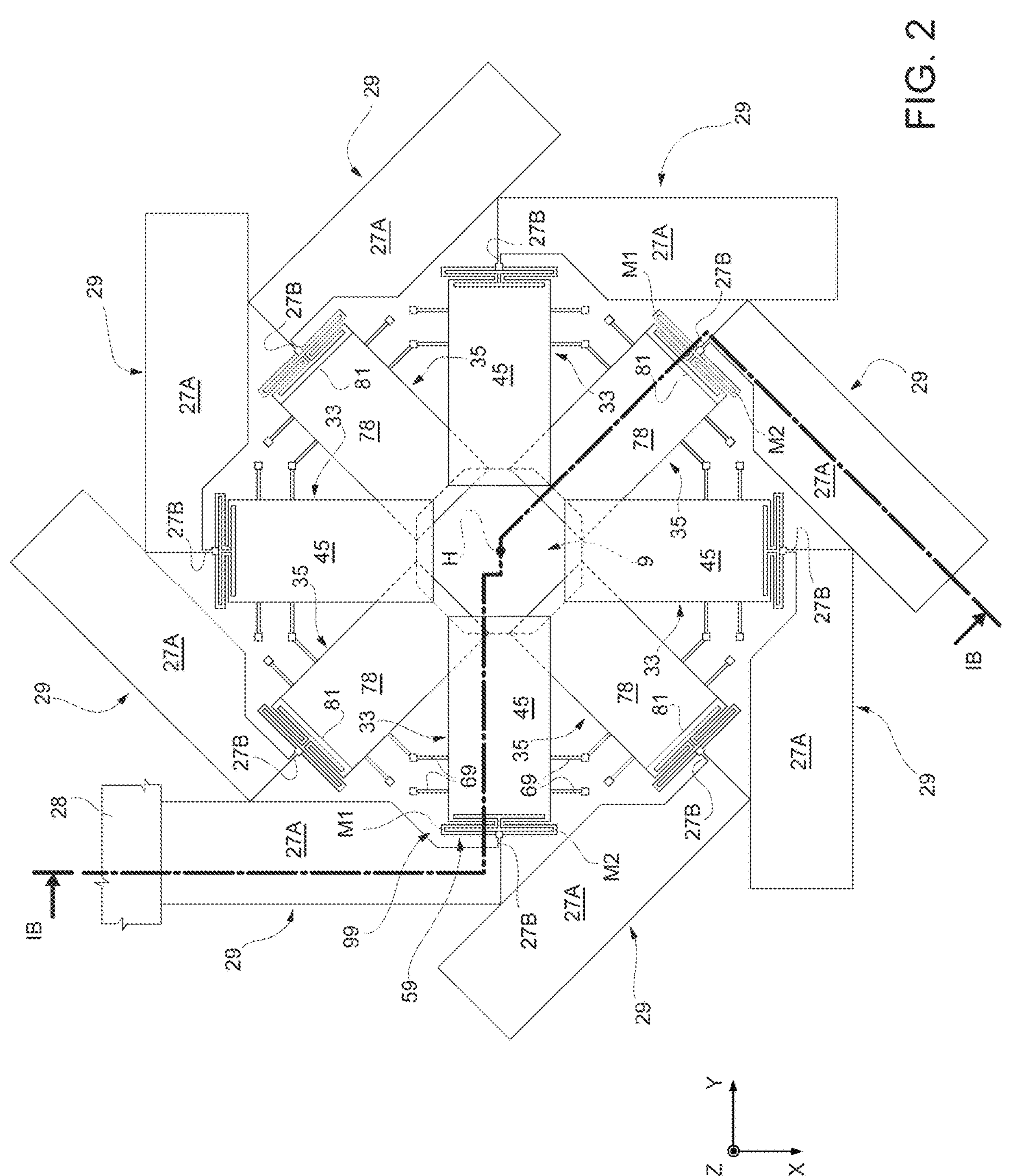
FIG. 2 is a schematic top plan view with portions removed of the MEMS shutter illustrated in FIG. 1B.

The MEMS shutter 1 further comprises a first semiconductor layer 14 and a second semiconductor layer 16, which are made of polycrystalline silicon and, as illustrated in FIG. 2, form a plurality of first shielding structures 33 and a plurality of second shielding structures 35. In connection with FIG. 2, this refers to the embodiment illustrated in FIG. 1B, which differs from the embodiment illustrated in FIG. 1A for the shape of the main aperture 9. In what follows, the description will be limited to the embodiment illustrated in FIG. 1A, except where otherwise specified; references to FIG. 2 will, however, be made, to the extent where they are applicable also to the embodiment illustrated in FIG. 1A.

Figure 3:
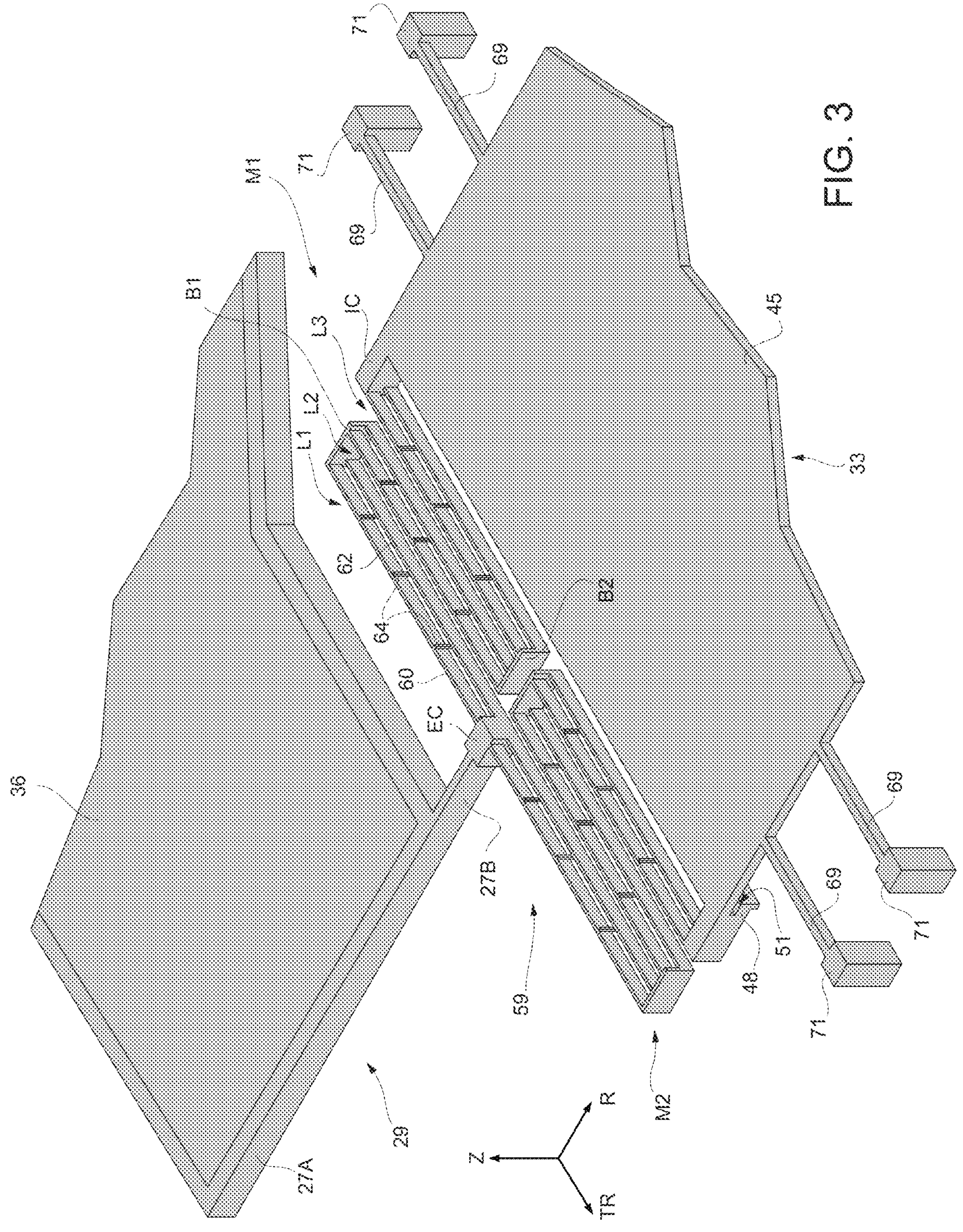
FIG. 3 is a schematic perspective view of a portion of the MEMS shutter illustrated in FIG. 1A, in resting conditions.

Each one of the first and second shielding structures 33, 35 is associated to a corresponding radial direction (one is illustrated in FIG. 3, where it is designated by R), which is parallel to the plane XY. As illustrated in FIG. 2, in the present example it is assumed that both the first and the second shielding structures 33, 35 are four in number. Furthermore, it is anticipated that each one of the first and second shielding structures 33, 35 is associated to a corresponding transverse direction TR, which is perpendicular to the plane ZR; consequently, it is perpendicular to the corresponding radial direction R.

In greater detail, the first semiconductor layer 14 forms: supporting regions 18, which overlie, in direct contact, corresponding anchorage regions 8; a bottom peripheral region 20; and a bottom inner structure 22, described in greater detail hereinafter.

The bottom peripheral region 20 forms a fixed bottom peripheral region 20', which overlies the supporting regions 18.

Furthermore, for each one of the first and second shielding structures 33, 35, the bottom peripheral region 20 forms a corresponding mobile bottom peripheral region 20", which extends in cantilever fashion from the fixed bottom peripheral region 20'. In particular, if we denote by $S_{ref}$ the top surface of the second dielectric region 6, the mobile bottom peripheral region 20" overlies the surface $S_{ref}$ at a distance.

The second semiconductor layer 16 forms a top peripheral region 26 and a top inner structure 30, described in greater detail hereinafter.

The top peripheral region 26 comprises a fixed top peripheral region 26', which overlies, in direct contact, the fixed bottom peripheral region 20', with which it forms a fixed peripheral structure 28.

Furthermore, for each one of the first and second shielding structures 33, 35, the top peripheral region 26 forms a corresponding mobile top peripheral region 26", which extends in direct contact on the corresponding mobile bottom peripheral region 20", with which it forms a corresponding cantilever structure 29, which extends in cantilever fashion from the aforementioned fixed peripheral structure 28.

As may be seen in FIGS. 2-3, each cantilever structure 29 comprises a main portion 27A and a secondary portion 27B, which are described hereinafter; the main portion 27A is visible also in FIG. 1A, albeit only approximately. In this connection, in general the figures are not in scale. As regards, instead, FIG. 3, not shown therein is the separation between the first and second semiconductor layers 14, 16; on the other hand, this separation does not correspond to a physical interface, but rather represents the fact that the first and second semiconductor layers 14, 16, albeit made of a same material, are formed at different times, as explained hereinafter.

This having been said, and with reference to the cantilever structure 29 corresponding to the first shielding structure 33 illustrated in FIGS. 1A and 3 (but this description also applies to the other cantilever structures 29 even when they are coupled to the second shielding structures 35), a first end of the main portion 27A is fixed with respect to a corresponding portion of the fixed peripheral structure 28 (just one of which is illustrated in FIG. 2); the secondary portion 27B is arranged between the main portion 27A and the first shielding structure 33.

In greater detail, in resting conditions, the main portion 27A has a planar shape, elongated along an axis oriented at 90° with respect to the radial direction R, whereas the secondary portion 27B is elongated in the radial direction R, with an approximately parallelepipedal shape. A first end of the secondary portion 27B is fixed with respect to the second end of the main portion 27A.

Without this implying any loss of generality, the main portion 27A has, in resting conditions and in top plan view, a shape tapered towards the secondary portion 27B so as to define a recess 99 (one of which is shown in FIG. 2) having for example a triangular shape. The shape of the secondary portion 27A may, however, vary with respect to what is illustrated.

Once again with reference to FIG. 1A, the MEMS shutter 1 comprises, for each one of the first and second shielding structures 33, 35, a corresponding actuator 36 of a piezoelectric type, which extends on the main portion 27A of the corresponding cantilever structure 29.

Each actuator 36 comprises: a first electrode 37, arranged on the main portion 27A of the corresponding cantilever structure 29 and made, for example, of a material chosen from among: Mo, Pt, Ti, Al, TiW; a piezoelectric region 38, arranged on the first electrode 37 and made, for example, of a material chosen from among: PZT, AlN, scandium-doped AlN; a second electrode 39, arranged on the piezoelectric region 38 and made, for example, of a material chosen from among: Mo, Pt, Ti, Al, TiW; and a protective region 34, which is made, for example, of a material chosen from among silicon oxide, silicon nitride, and aluminum nitride and extends on the second electrode 39, as well as surrounding laterally the first and second electrodes 37, 39 and the piezoelectric region 38 until it comes into contact with the main portion 27A of the corresponding cantilever structure 29. In a per se known manner and thus not described in detail or illustrated, between the first and second electrodes 37, 39 a voltage may be applied, for example through appropriate electrical contacts (not illustrated), which enables operation of the actuator 36.

Once again with reference to the first and second shielding structures 33, 35, they are formed by the bottom inner structure 22 and the top inner structure 30.

In greater detail, the first shielding structures 33 are the same as one another and in resting conditions are spaced at equal angular distances apart with respect to the axis of symmetry H; in particular, pairs of first adjacent shielding structures 33 are spaced apart at an angular distance of 90°. The second shielding structures 35 are the same as one another and are spaced at equal angular distances apart with respect to the axis of symmetry H; in particular, pairs of second adjacent shielding structures 35 are spaced apart at an angular distance of 90°. Furthermore, the first and second shielding structures 33, 35 are arranged so as to alternate with one another at angular distances apart. Each first shielding structure 33 is thus angularly arranged between a pair of second adjacent shielding structures 35, which are at a distance of 45° from the first shielding structure 33; likewise, each second shielding structure 35 is angularly arranged between a pair of first adjacent shielding structures 33, which are at a distance of 45° from the second shielding structure 35.

In what follows, the first shielding structures 33 are described with reference to FIGS. 1A and 3, where, as explained previously, just one first shielding structure 33 is visible.

In detail, the first shielding structure 33 comprises a respective top shielding region 40, formed by the inner mobile portion 30 of the second semiconductor layer 16, and an underlying bottom secondary region 42, formed by the inner mobile portion 22 of the first semiconductor layer 14.

The top shielding region 40 has a rectangular shape, in top plan view, and an L-shaped cross-section. In particular, the top shielding region 40 comprises a main portion 45, which has the shape of a parallelepiped with axis parallel to the radial direction R and with ends facing the axis of symmetry H and the top peripheral region 26, respectively, and a secondary portion 46, which has a parallelepipedal shape and is arranged underneath the end of the main portion 45 facing the top peripheral region 26.

The bottom secondary region 42 comprises a respective main portion 48, which has the shape of a parallelepiped with axis parallel to the radial direction R and with ends facing the bottom peripheral region 20 and the axis of symmetry H, respectively, and a respective secondary portion 49, which has a parallelepipedal shape and is arranged underneath the end of the main portion 48 facing the axis of symmetry H.

The secondary portion 46 of the top shielding region 40 overlies, in direct contact, the end facing the bottom peripheral region 20 of the main portion 48 of the bottom secondary region 42. Extending underneath the secondary portion 49 of the bottom secondary region 42 is a suspended conductive region 50, made of polysilicon.

To a first approximation, and without this implying any loss of generality, the main portions 45, 48 and the secondary portions 46, 49 of the top shielding region 40 and the bottom secondary region 42 have a same extension in the transverse direction TR associated to the first shielding region 33.

In greater detail, the main portion 45 of the top shielding region 40 and the main portion 48 of the bottom secondary region 42 extend in cantilever fashion from the secondary portion 46 of the top shielding region 40, towards the axis of symmetry H, without intercepting it, and delimiting, at the top and at the bottom respectively, a corresponding recess 51, which is laterally delimited by the secondary portion 46. In addition, in the radial direction R, the main portion 45 of the top shielding region 40 has an extension greater than the main portion 48 of the bottom secondary region 42, and is consequently at a shorter distance from the axis of symmetry H.

In resting conditions, at least part of the main portion 45 of the top shielding region 40 is suspended over the main aperture 9, i.e., it projects towards the axis of symmetry H, with respect to the underlying bottom secondary region 42.

Without this implying any loss of generality, also part of the main portion 48 of the bottom secondary region 42 is suspended, together with the corresponding secondary portion 49, over the main aperture 9, albeit at a greater distance from the axis of symmetry H as compared to the aforementioned part of the main portion 45 of the top shielding region 40. Without this implying any loss of generality, the secondary portion 46 of the top shielding region 40 is at least in part laterally staggered with respect to the main aperture 9, even though variants are possible, in which, for example, the entire first shielding structure 33 is arranged on top of the main aperture 9, or else variants in which the entire bottom secondary region 42 is laterally staggered with respect to the main aperture 9, as illustrated, for example, in FIG. 1B.

In top plan view, the area of overlapping between the main portion 45 of the top shielding region 40 and the main aperture 9 is greater than the area of overlapping between the main portion 48 of the bottom secondary region 42 and the main aperture 9 since, as explained previously, the main portion 45 of the top shielding region 40 has a radial extension greater than the main portion 48 of the bottom secondary region 42.

The bottom inner structure 22 of the first semiconductor layer 14 and the top inner structure 30 of the second semiconductor layer 16 further form a corresponding deformable coupling structure 59 for each one of the first and second shielding structures 33, 35. The deformable coupling structures 59 are the same as one another; for example, described in what follows is the deformable coupling structure 59 for the first shielding structure 33 illustrated in FIGS. 1A and 3.

In detail, as shown in FIG. 3, the deformable coupling structure 59 comprises a first elastic structure M1 and a second elastic structure M2, which in FIG. 2 are illustrated in a simplified way.

The first and second elastic structures M1, M2 are the same as, and symmetrical to, one another, with respect to a plane perpendicular to the plane XY and parallel to the radial direction R. Consequently, described in what follows is just the first elastic structure M1.

The first elastic structure M1 is an elastic transformation element of the same type as the one described in the patent application EP3872451, filed on Feb. 25, 2021 in the name of the present applicant. Furthermore, without this implying any loss of generality, the first elastic structure M1 extends at least in part within the recess 99, in order to reduce the overall dimensions.

In detail, the first elastic structure M1 comprises a first elongated structure L1, a second elongated structure L2, and a third elongated structure L3, a first connecting arm B1 and a second connecting arm B2, an outer coupling region EC and an inner coupling region IC, which are now described with reference to the resting conditions illustrated in FIG. 3.

The outer coupling region EC has approximately a parallelepipedal shape, is formed by the bottom inner structure 22 of the first semiconductor layer 14 and the top inner structure 30 of the second semiconductor layer 16, and is fixed with respect to the second end of the secondary portion 27B of the cantilever structure 29.

Figure 4:
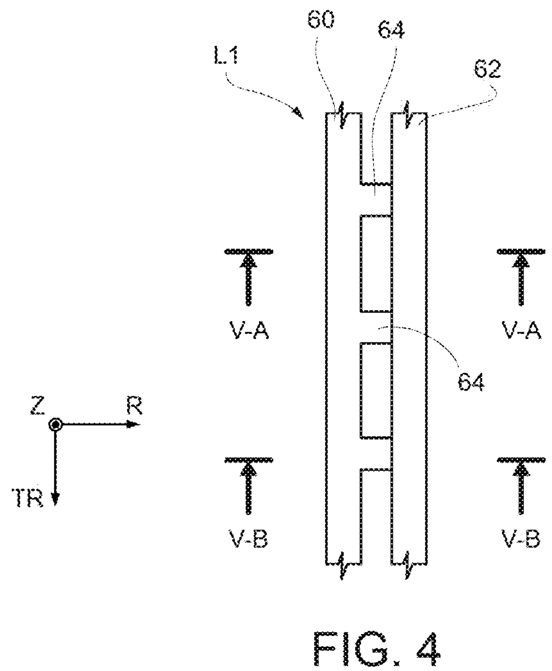
FIG. 4 is a schematic top plan view of a portion of the MEMS shutter illustrated in FIG. 3.
Figure 5A:
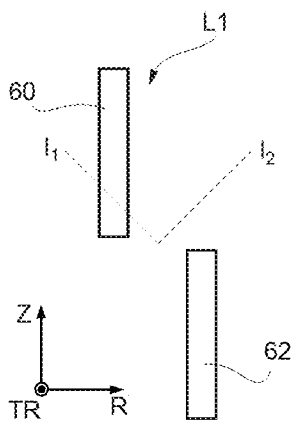
FIGS. 5A and 5B are schematic cross-sectional views of the portion of MEMS shutter illustrated in FIG. 4, taken, respectively, along the lines of section V-A-V-A and V-B-V-B.
Figure 5A:
Figure 5B:
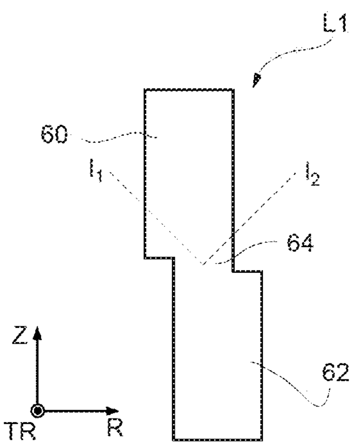

Without this implying any loss of generality, the first, second, and third elongated structures L1, L2, L3 are the same as one another, co-planar and staggered in a direction parallel to the radial direction R. For this reason, just the first elongated structure L1 is described in what follows, with reference to FIGS. 4 and 5A-5B.

In detail, the first elongated structure L1 comprises a top elongated portion 60, formed by the top inner structure 30 of the second semiconductor layer 16, and a bottom elongated portion 62, formed by the bottom inner structure 22 of the first semiconductor layer 14.

The top elongated portion 60 and the bottom elongated portion 62 are staggered in a direction parallel to the radial direction R and have a parallelepipedal shape (for example, approximately the same shape) with axes parallel to the transverse direction TR and arranged at different heights, measured along the axis Z.

Without this implying any loss of generality, the top elongated portion 60 is located at a greater height than the bottom elongated portion 62; furthermore, the top elongated portion 60 and the bottom elongated portion 62 are vertically separate, i.e., they don't overlap one another in side view.

The first elongated structure L1 further comprises a plurality of transverse portions 64 (three of which are illustrated in FIG. 3), which, without this implying any loss of generality, are the same as one another, have a parallelepipedal shape with axes parallel to the axis Z and are, for example, equally spaced apart in a direction parallel to the transverse direction TR. Furthermore, the transverse portions 64 are arranged between the top elongated portion 60 and the bottom elongated portion 62, which are arranged on opposite sides of each transverse portion 64. In particular, a top portion of each transverse portion 64 laterally contacts the top elongated portion 60, whereas a bottom part of the transverse portion 64 laterally contacts the bottom elongated portion 62. The top elongated portion 60, the bottom elongated portion 62 and the transverse portions 64 form a single piece of polysilicon.

The first connecting arm B1 is formed by the bottom inner structure 22 of the first semiconductor layer 14 and the top inner structure 30 of the second semiconductor layer 16 and has an approximately planar shape (in particular, a parallelepipedal shape), parallel to the plane ZR. The first ends of the top elongated portion 60 and of the bottom elongated portion 62 are fixed with respect to the first connecting arm B1. The second ends of the top elongated portion 60 and of the bottom elongated portion 62 are fixed with respect to the outer coupling region EC. Furthermore, the top elongated portion 60 and the bottom elongated portion 62 of the second elongated structure L2 have respective first ends, which are fixed with respect to the first connecting arm B1, which is thus arranged between the first and second elongated structures L1, L2.

The second ends of the top elongated portion 60 and of the bottom elongated portion 62 of the second elongated structure L2 are fixed with respect to the second connecting arm B2, which has to a first approximation the same shape as the first connecting arm B1.

The first ends of the top elongated portion 60 and of the bottom elongated portion 62 of the third elongated structure L3 are fixed with respect to the inner coupling region IC, which is formed by the bottom inner structure 22 of the first semiconductor layer 14 and the top inner structure 30 of the second semiconductor layer 16, has an approximately parallelepipedal shape and extends in cantilever fashion starting (for example) from an angular portion of the first shielding structure 33, with respect to which it is fixed. In particular, the inner coupling region IC is fixed with respect to portions of the top shielding region 40 and the bottom secondary region 42.

The second ends of the top elongated portion 60 and of the bottom elongated portion 62 of the third elongated structure L3 are fixed with respect to the second connecting arm B2, which is thus arranged between the second and third elongated structures L2, L3.

In practice, the first elastic structure M1 has the shape of a folded spring, the behavior of which is of the type described in the aforementioned patent application EP3872451 and is summarized hereinafter. Furthermore, the first elastic structure M1 is compliant along the axis Z and in the radial direction R and is rigid in the transverse direction TR.

As may be seen in FIGS. 2 and 3, for each first shielding structure 33, the MEMS shutter 1 further comprises four first planar springs 69, which are now described, by way of example, with reference to the first shielding structure 33 illustrated in FIG. 3.

In detail, the first planar springs 69 are formed by the inner mobile portion 30 of the second semiconductor layer 16 and have an elongated shape. In particular, in resting conditions, the first planar springs 69 are shaped like parallelepipeds elongated in a direction parallel to the transverse direction TR, with first ends fixed with respect to the main portion 45 of the top shielding region 40 and with second ends fixed with respect to corresponding first pillar regions 71. For reasons that will be clarified hereinafter, the first planar springs 69 are rigid along the axis Z and compliant in a direction parallel to the corresponding radial direction R, and more in general in a direction parallel to the plane XY.

In greater detail, the first planar springs 69 are arranged two by two on opposite sides of the main portion 45 of the top shielding region 40, in a way symmetrical with respect to a plane of symmetry parallel to the plane RZ. Furthermore, the first pillar regions 71 are formed both by the first and second semiconductor layers 14, 16 (in particular, by portions of the fixed bottom peripheral region 20' and by underlying supporting regions 18, as well as by portions of the fixed top peripheral region 26') and are anchored at the bottom to corresponding anchorage regions 8.

As regards the second shielding structures 35, they are now described with reference, by way of example, to the second shielding structure 35 illustrated in FIGS. 1A and 6.

In detail, the second shielding structure 35 comprises a respective bottom shielding region 75, formed by the bottom inner structure 22 of the first semiconductor layer 14, and an overlying top secondary region 77, formed by the top inner structure 30 of the second semiconductor layer 16.

The bottom shielding region 75 comprises a respective main portion 78, which has the shape of a parallelepiped with axis parallel to the radial direction R associated to the second shielding structure 35 and with ends facing, respectively, the axis of symmetry H and the bottom peripheral region 20. The bottom shielding region 75 further comprises a respective secondary portion 79, which has a parallelepipedal shape and is arranged underneath the end of the main portion 78 facing the axis of symmetry H. Extending underneath the secondary portion 79 is a corresponding suspended conductive region 80, made of polysilicon.

The top secondary region 77 comprises a respective main portion 81 and a respective secondary portion 83. The main portion 81 has the shape of a parallelepiped with axis parallel to the radial direction R associated to the second shielding structure 35 and with ends facing, respectively, the top peripheral region 26 and the axis of symmetry H. The secondary portion 83 has a parallelepipedal shape, is arranged underneath the end of the main portion 81 facing the top peripheral region 26, and further overlies, in direct contact, the end facing the bottom peripheral region 20 of the main portion 78 of the bottom shielding region 75.

To a first approximation, and without this implying any loss of generality, the main portions 78, 81 and the secondary portions 79, 83 of the bottom shielding region 75 and of the top secondary region 77 have a same extension in the transverse direction TR associated to the second shielding region 35.

Furthermore, the main portion 78 of the bottom shielding region 75 and the main portion 81 of the top secondary region 77 extend in cantilever fashion from the secondary portion 83 of the top secondary region 77, towards the axis of symmetry H, without intercepting it, and delimiting, at the top and at the bottom respectively, a corresponding recess 89, which is laterally delimited by the secondary portion 83 of the top secondary region 77.

In addition, in the radial direction R associated to the second shielding structure 35, the main portion 78 of the bottom shielding region 75 has an extension greater than the main portion 81 of the top secondary region 77, and is consequently at a shorter distance from the axis of symmetry H. Consequently, the main portion 81 of the top secondary region 77 leaves exposed a part facing the axis of symmetry H of the main portion 78 of the bottom shielding region 75.

In even greater detail, in resting conditions, the secondary portion 79 and at least part of the main portion 78 of the bottom shielding region 75 are suspended over the main aperture 9. Without this implying any loss of generality, the secondary portion 83 of the top secondary region 77 is at least in part laterally staggered with respect to the main aperture 9, even though variants are possible, in which, for example, the entire second shielding structure 35 is arranged on top of the main aperture 9, or else variants in which the entire top secondary region 77 is laterally staggered with respect to the main aperture 9, as illustrated, for example, in FIG. 1B. Furthermore, in top plan view, the area of overlapping between the main portion 78 of the bottom shielding region 75 and the main aperture 9 is greater than the area of overlapping between the main portion 81 of the top secondary region 77 and the main aperture 9 since, as explained previously, the main portion 78 of the bottom shielding region 75 has an extension in the radial direction R greater than the extension of the main portion 81 of the top secondary region 77.

Figure 6:
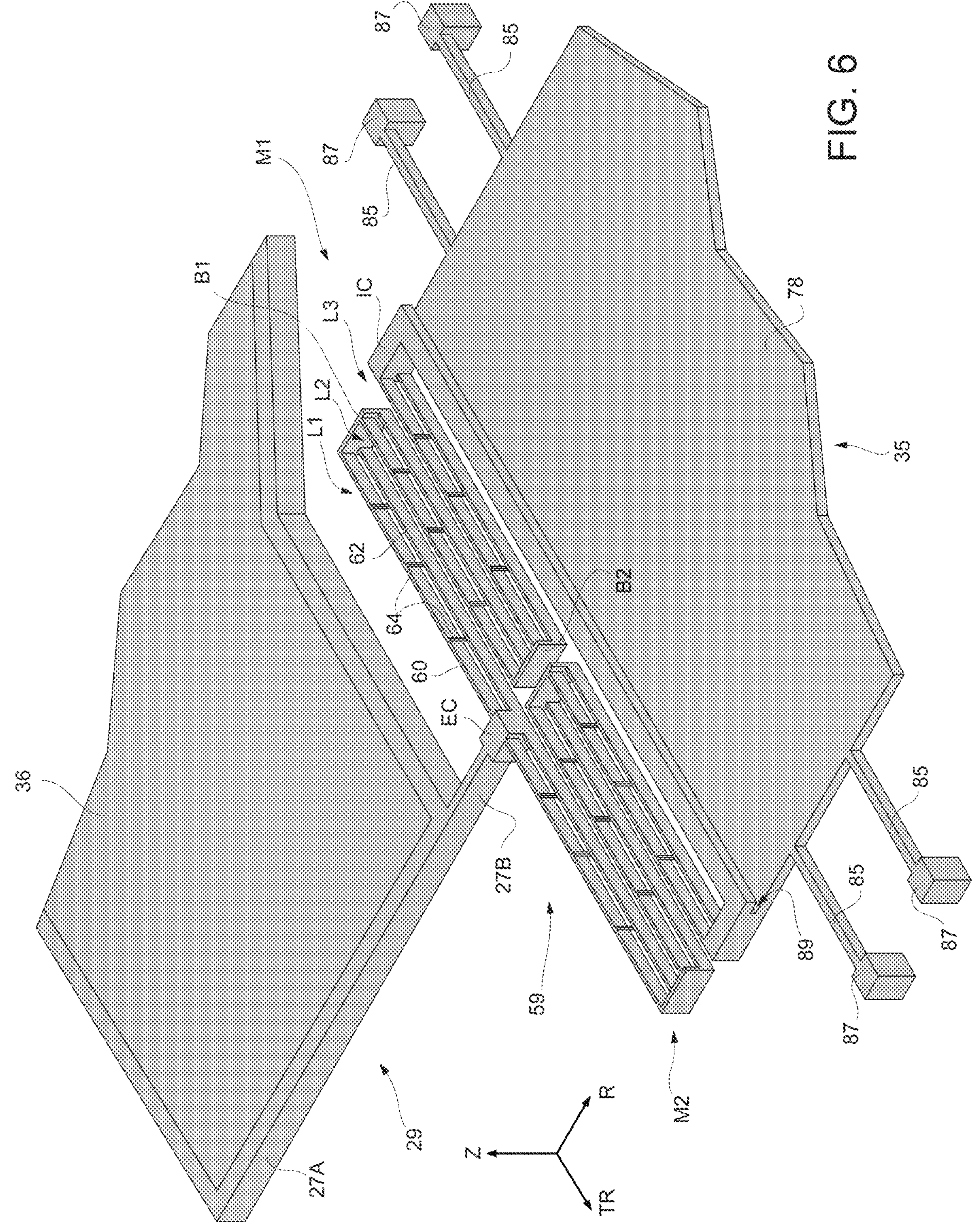
FIG. 6 is a schematic perspective view of a further portion of the MEMS shutter illustrated in FIG. 1A, in resting conditions.

As illustrated in FIG. 6, coupling between the second shielding structure 35 and the corresponding cantilever structure 29 is obtained thanks to the interposition of the corresponding deformable coupling structure 59, in the same way as described with reference to the first shielding structure 33. In particular, for each of the corresponding first and second elastic structures M1, M2, the corresponding inner coupling region IC extends in cantilever fashion starting (for example) from an angular portion of the second shielding structure 35, with respect to which it is fixed. In particular, the inner coupling region IC is fixed with respect to portions of the bottom shielding region 75 and of the top secondary region 77.

For each second shielding structure 35, the MEMS shutter 1 further comprises four second planar springs 85, which are now described, by way of example, with reference to the second shielding structure 35 illustrated in FIG. 6.

In detail, the second planar springs 85 are formed by the bottom inner structure 22 of the first semiconductor layer 14 and have an elongated shape. In particular, in resting conditions the second planar springs 85 are shaped like parallelepipeds elongated in a direction perpendicular with respect to the corresponding radial direction R (i.e., in a direction parallel to the corresponding transverse direction TR), with first ends fixed with respect to the main portion 78 of the bottom shielding region 75 and with second ends fixed with respect to corresponding second pillar regions 87. For reasons that will be clarified hereinafter, the second planar springs 85 are rigid along the axis Z and compliant in a direction parallel to the corresponding radial direction R, and more in general in a direction parallel to the plane XY.

In greater detail, the second planar springs 85 are arranged two by two on opposite sides of the main portion 78 of the bottom shielding region 75, in a way symmetrical with respect to a plane of symmetry parallel to the plane RZ. Furthermore, the second pillar regions 87 are formed by the first semiconductor layer 14 (in particular, by portions of the fixed bottom peripheral region 20' and by underlying supporting regions 18) and are anchored, at the bottom, to corresponding anchorage regions 8.

All this having been said, in resting conditions the top shielding regions 40 of the first shielding structures 33 and the bottom shielding regions 75 of the second shielding structures 35 occlude only partially the underlying main aperture 9. In particular, when the first and second shielding structures 33, 35 are in resting conditions, the maximum (partial) occlusion of the main aperture 9 is obtained; equivalently, in resting conditions there occurs the minimum optical aperture, understood as area of the main aperture 9 that may be traversed by a light beam that impinges with normal incidence upon the MEMS shutter 1. Furthermore, each actuator 36 may be operated so as to move in the respective radial direction R the corresponding first/second shielding structure 33/35, in a direction opposite to the axis of symmetry H, thus reducing occlusion of the underlying main aperture 9, as described in detail hereinafter with reference to the first shielding structure 33 illustrated in FIG.

3, even though the same considerations apply also to the second shielding structures 35.

Figure 7:
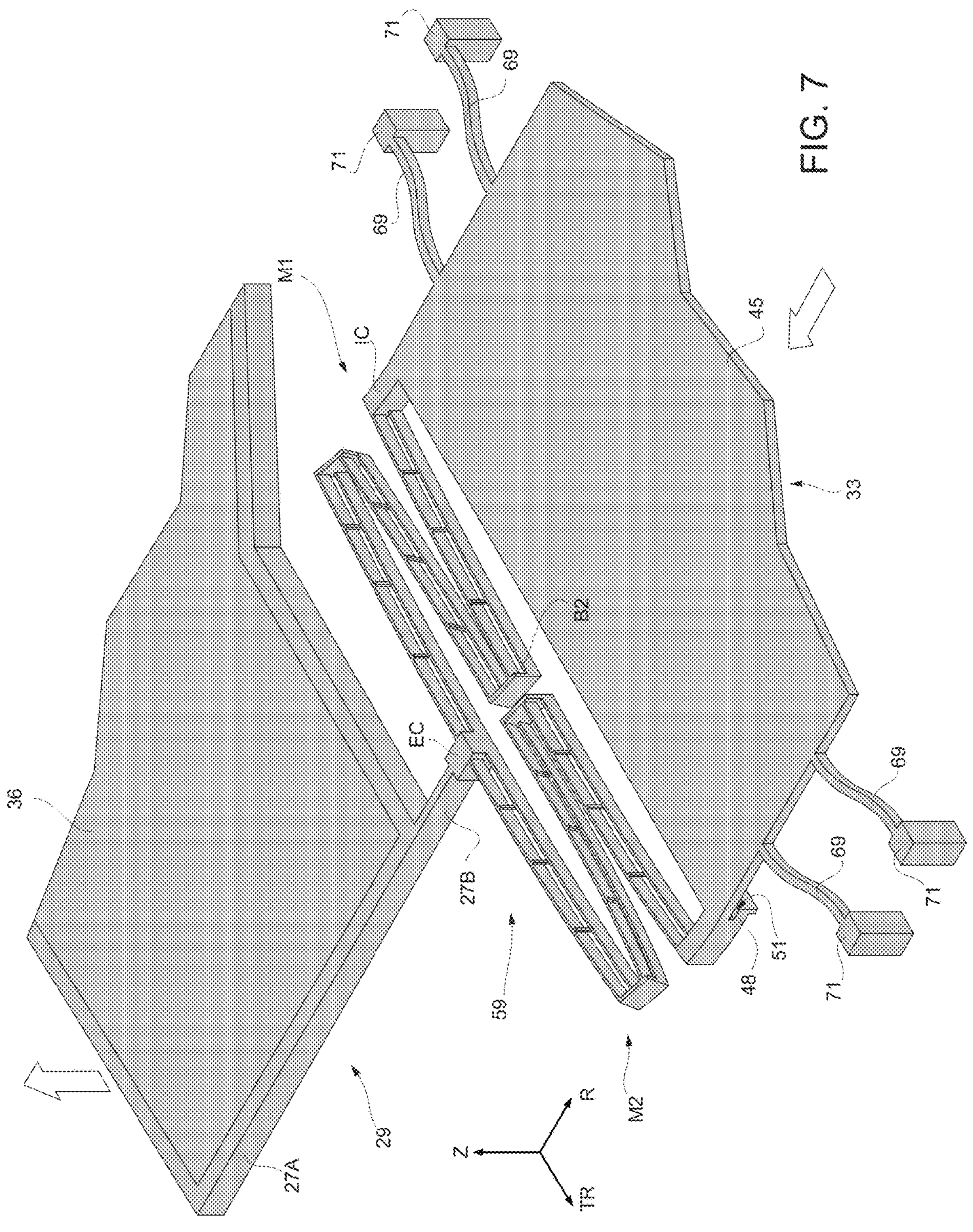
FIG. 7 is a schematic perspective view of the portion of the MEMS shutter illustrated in FIG. 6, in conditions of actuation.

As illustrated in FIG. 7, the actuator 36 may be operated so as to cause a translation along the axis Z of the corresponding cantilever structure 29, and consequently also of the outer coupling region EC, which drags upwards the portions of the first and second elastic structures M1, M2 fixed with respect thereto. Since the portions of the first and second elastic structures M1, M2 fixed, via the inner coupling region IC, with respect to the first shielding structure 33 may not translate along the axis Z, on account of the constraint exerted by the first planar springs 69, the deformable coupling structure 59 undergoes deformation as illustrated qualitatively in FIG. 7.

In detail, the first and second elastic structures M1, M2 behave in the same way as described in the aforementioned patent application EP3872451. In particular, with reference, for example, to the first elastic structure M1, and further with reference, for example, to the first elongated structure L1, each section of the first elongated structure L1 taken in a plane parallel to the plane ZR has a pair of principal axes of inertia $I_1$, $I_2$ (illustrated in FIGS. 5A and 5B, which refer to FIG. 4), each of which is transverse both with respect to the radial direction R and with respect to the axis Z. Consequently, a force applied to the first elongated structure L1 along the axis Z generates a so-called deviated flexure of the first elongated structure L1; in particular, said force causes a deformation along the axis Z, which leads to a consequent deformation in the corresponding radial direction R of the first elongated structure L1.

In practice, whereas the portions of the first and second elastic structures M1, M2 fixed with respect to the outer coupling region EC translate to a first approximation along the axis Z, but do not undergo any movement in the plane XY, the portions of the first and second elastic structures M1, M2 fixed with respect to the inner coupling region IC do not undergo translations along the axis Z, but translate in the corresponding radial direction R, in a direction opposite to the axis of symmetry H, dragging the first shielding structure 33 and reducing the area of overlapping between the latter and the underlying main aperture 9. On account of this dragging action, the first planar springs 69 curve, in top plan view.

Occlusion of the main aperture 9 decreases as the first and second shielding structures 33, 35 move away from the axis of symmetry H. Furthermore, thanks to the fact that each first shielding structure 33 is angularly arranged between a pair of second shielding structures 35 and vice versa, and thanks to the fact that the top shielding regions 40 and the bottom shielding regions 75 are formed, respectively, by the second semiconductor layer 16 and by the first semiconductor layer 14 and are thus arranged on different levels, the movement of each shielding structure may take place in a way independent of the movement of the adjacent shielding structures, without there occurring any impact or limitation of the movement. In this connection, as illustrated in FIG. 2, and without this implying any loss of generality, in resting conditions the end facing the axis of symmetry H of the main portion 45 of each top shielding region 40 overlies portions of the ends facing the axis of symmetry H of the main portions 78 of the two adjacent bottom shielding regions 75.

In practice, control of occlusion of the main aperture 9 is performed over the entire perimeter of the main aperture 9 and with a large number of degrees of freedom.

Figure 8:
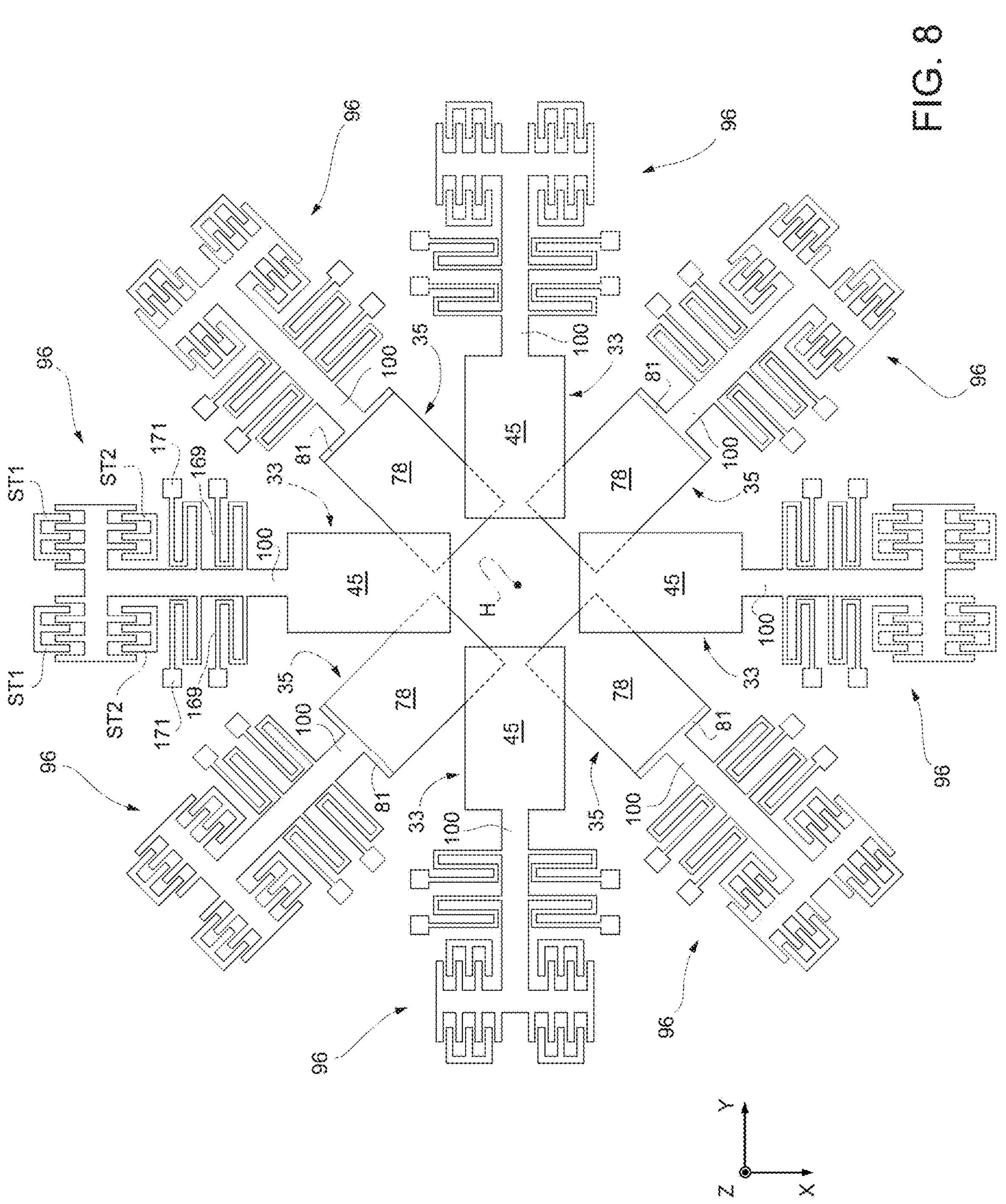
FIG. 8 is a schematic top plan view with portions removed of a variant of the present MEMS shutter.
Figure 9:
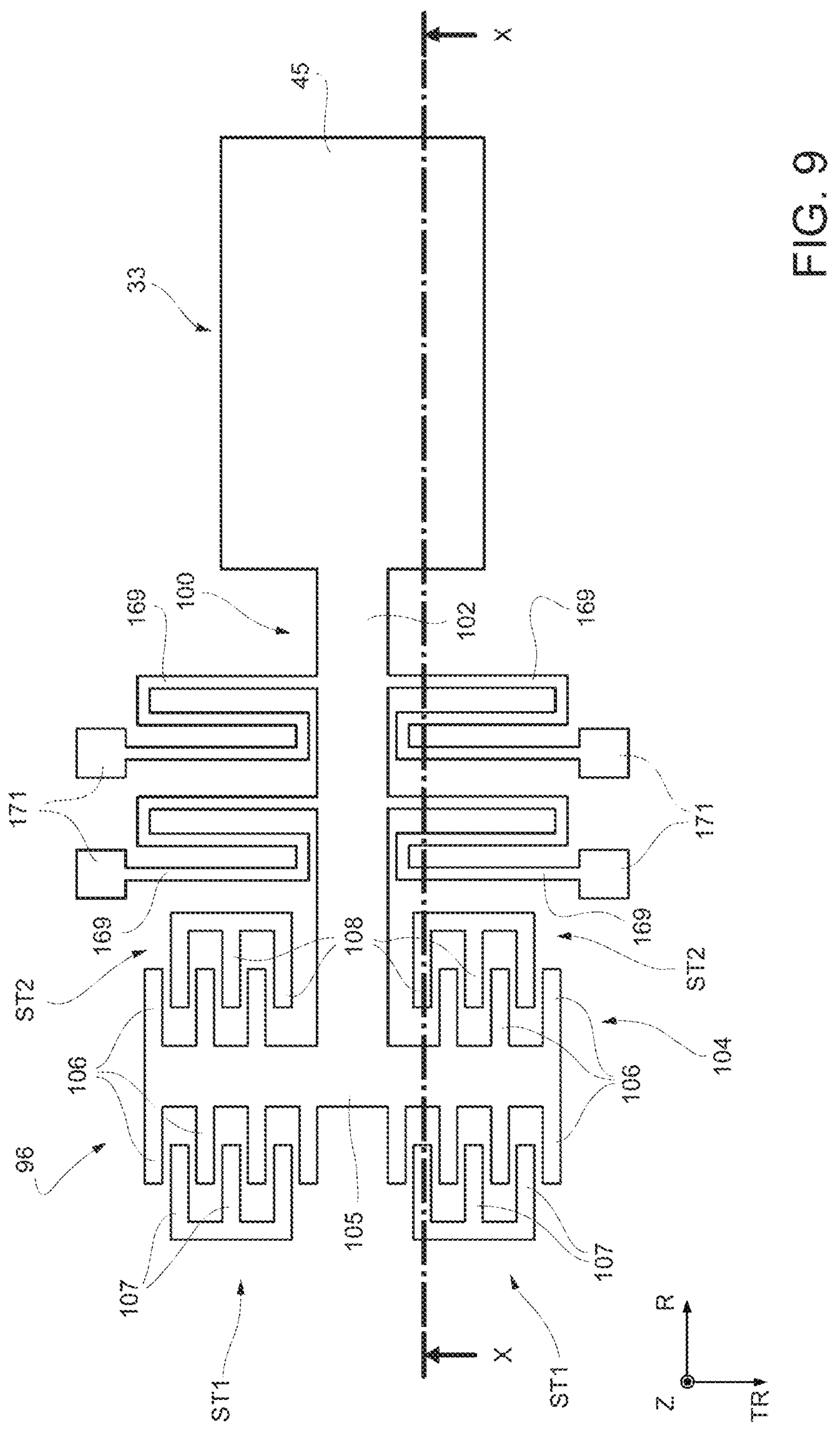
FIG. 9 is a schematic top plan view of a portion of the MEMS shutter illustrated in FIG. 8.

According to a variant illustrated in FIG. 8 (where, for simplicity, the main aperture 9 is not illustrated), the first and second shielding structures 33, 35 are of the same type as described previously, have the same arrangement in resting conditions and have the same capacity of carrying out translations in the respective radial directions R, but the actuators (designated by 96) are of an electrostatic type. This variant is now described, purely by way of example, with reference to the actuator 96 coupled to the first shielding structure 33 illustrated in FIG. 9, but the description also applies to the actuators 96 coupled to the second shielding structures 35.

In detail, the actuator 96 is of an electrostatic type and comprises, for example, a pair of first stator regions ST1 and a pair of second stator regions ST2, which are formed by corresponding portions of the fixed peripheral structure 28 (i.e., by corresponding portions of the fixed bottom peripheral region 20' and of the fixed top peripheral region 26'), as well as by underlying supporting regions 18 and by underlying anchorage regions 8. The first and second stator regions ST1, ST2 are thus fixed with respect to the underlying substrate 2.

Furthermore, the first shielding structure 33 is operatively coupled to the actuator 96 through a coupling body 100, which is approximately T-shaped in top plan view.

Figure 10:
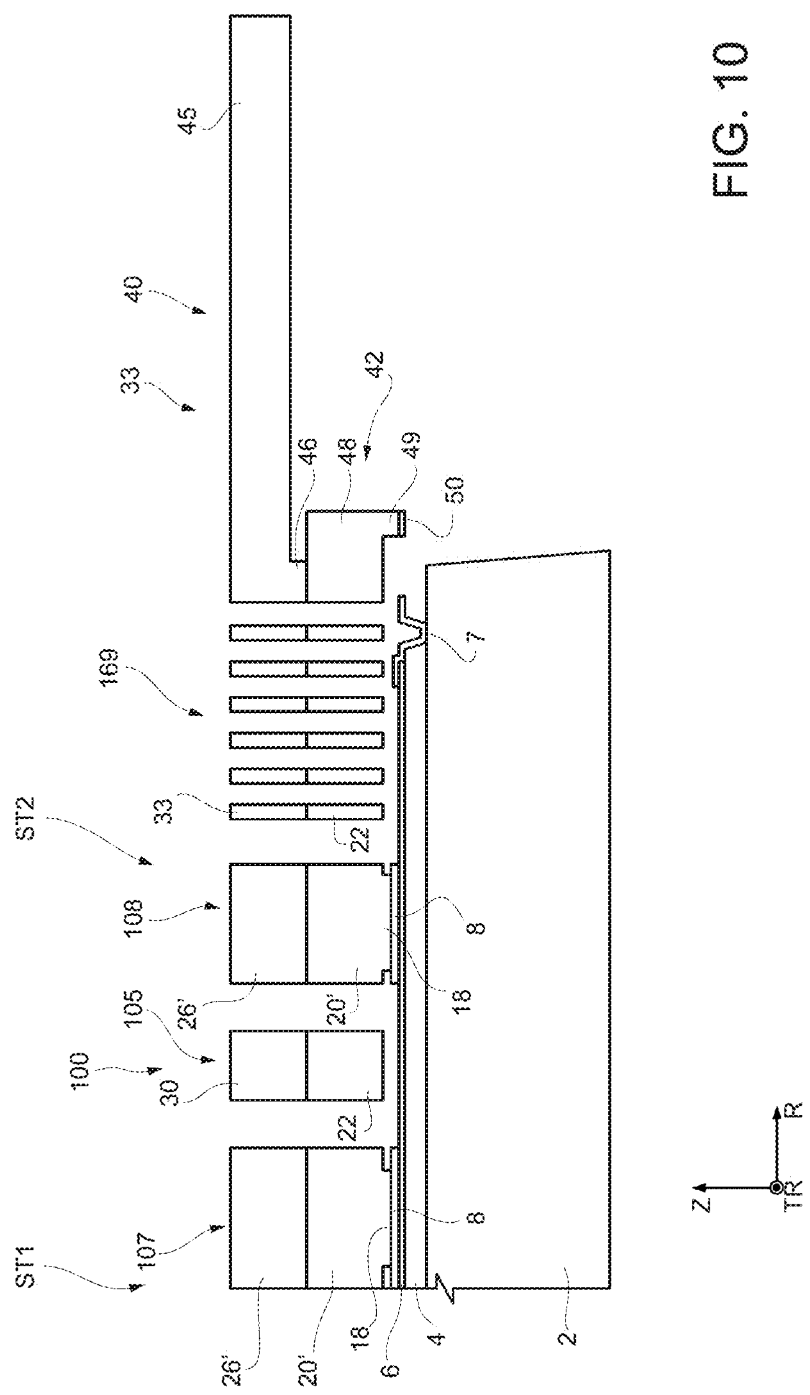
FIG. 10 is a schematic cross-sectional view of a portion of the MEMS shutter illustrated in FIGS. 8-9, taken along a line of section X-X illustrated in FIG. 9.

In particular, as illustrated in FIG. 10, the coupling body 100 is formed by the bottom inner structure 22 of the first semiconductor layer 14 and the top inner structure 30 of the second semiconductor layer 16. Furthermore, the coupling body 100 comprises an elongated portion 102 with a parallelepipedal shape, which extends in a direction parallel to the radial direction R, and a transverse portion 104, which in turn comprises a supporting portion 105, which has a shape elongated in a direction parallel to the transverse direction TR, and a plurality of coupling portions 106, which are arranged on two opposite sides of the supporting portion 105 and are staggered in the transverse direction TR, each coupling portion 106 departing from the respective side of the supporting portion 105, in a direction parallel to the radial direction R.

The elongated portion 102 has a first end fixed with respect to the first shielding structure 33 and a second end fixed with respect to the supporting portion 105 of the transverse portion 104, which functions, together with the coupling portions 106, as rotor region.

The first and second stator regions ST1, ST2 extend on opposite sides of the transverse portion 104 and form corresponding pluralities of elements elongated in the radial direction R (designated, respectively, by 107 and 108). The elongated elements 107 of each first stator region ST1 are laterally staggered in a direction parallel to the transverse direction TR so as to be interdigitated with respect to a corresponding set of coupling portions 106. Likewise, the elongated elements 108 of each second stator region ST2 are laterally staggered in a direction parallel to the transverse direction TR so as to be interdigitated with respect to a corresponding set of coupling portions 106.

Two pairs of third pillar regions 171 extend on opposite sides of the elongated portion 102 of the coupling body 100 and have the same structure as the first pillar regions 71 and are thus anchored at the bottom to corresponding anchorage regions 8. Each third pillar portion 171 is mechanically coupled to the elongated portion 102 of the coupling body 100 by interposition of a corresponding third planar spring 169, which has, for example, a folded shape, is formed by the bottom inner structure 22 of the first semiconductor layer 14 and the top inner structure 30 of the second semiconductor layer 16 and is rigid along the axis Z and compliant in a direction parallel to the corresponding radial direction R, and more in general in a direction parallel to the plane XY.

In practice, the first shielding structure 33 and the coupling body 100 are suspended and constrained to the third pillar regions 171 by interposition of the third planar springs 169. Albeit not illustrated, variants are, however, possible in which the third planar springs 169 have ends fixed to the first shielding structure 33, instead of to the coupling body 100.

In use, by applying voltages between the first and second stator regions ST1, ST2 and the rotor region, the coupling body 100 is subjected to a force of an electrostatic nature, which causes a translation of the coupling body 100 with respect to the first and second stator regions ST1, ST2, in the corresponding radial direction R; said translation may take place in either direction. The first shielding structure 33 translates in a way fixed with respect to the coupling body 100 in the corresponding radial direction R, with consequent variation of occlusion of the underlying main aperture 9.

The advantages afforded by arranging first and second shielding structures 33, 35 that form shields in different semiconductor layers are thus obtained also with this variant. Furthermore, according to this variant, the shielding structures may be subject, with respect to the positions assumed in the resting conditions, to both positive and negative movements, measured with respect to the respective radial directions R.

Positive and negative displacements with respect to the positions of rest may be obtained also in the case of use of piezoelectric actuators, as illustrated with reference to FIG. 11, which is now described limitedly to the differences with respect to what is illustrated in FIG. 3.

In detail, the cantilever structure (here designated by 229) comprises the secondary portion 27B, which is coupled to the corresponding shielding structure in the same way as described previously; in this connection, in FIG. 11 reference is made, by way of example, to a first shielding structure 33.

The main portion (here designated by 227A) of the cantilever structure 229 has a folded shape so as to define a sort of C shape in top plan view; in particular, the main portion 227A comprises a first elongated subportion 228A and a second elongated subportion 228B and a connecting subportion 228C. For instance, the first elongated subportion 228A has the same shape as the main portion 27A of the cantilever structure 29 illustrated in FIGS. 2-3. Furthermore, the second elongated subportion 228B has, for example, the shape of a parallelepiped elongated in a direction parallel to the corresponding transverse direction TR; the first and second elongated subportions 228A, 228B are staggered in the radial direction R and are connected by the connecting subportion 228C.

In greater detail, the end of the first elongated subportion 228A opposite to the deformable coupling structure 59 is fixed with respect to the connecting subportion 228C. A first end and a second end of the second elongated subportion 228B are fixed with respect to the fixed peripheral structure 28 and the connecting subportion 228C, respectively.

In addition, the first elongated subportion 228A is overlaid by a corresponding first actuator, here designated by 236', of the same type as the one described with reference to FIGS. 1A and 3, whereas the second elongated subportion 228B is overlaid by a corresponding second actuator, here designated by 236", of the same type as the one described with reference to FIGS. 1A and 3 and electrically uncoupled from the first actuator 236'. In this way, by supplying voltage alternatively to the first actuator 236' or to the second actuator 236", translations of the secondary portion 27B are obtained along the axis Z in opposite directions, with consequent translations of the corresponding shielding structure in opposite directions.

Figure 12:
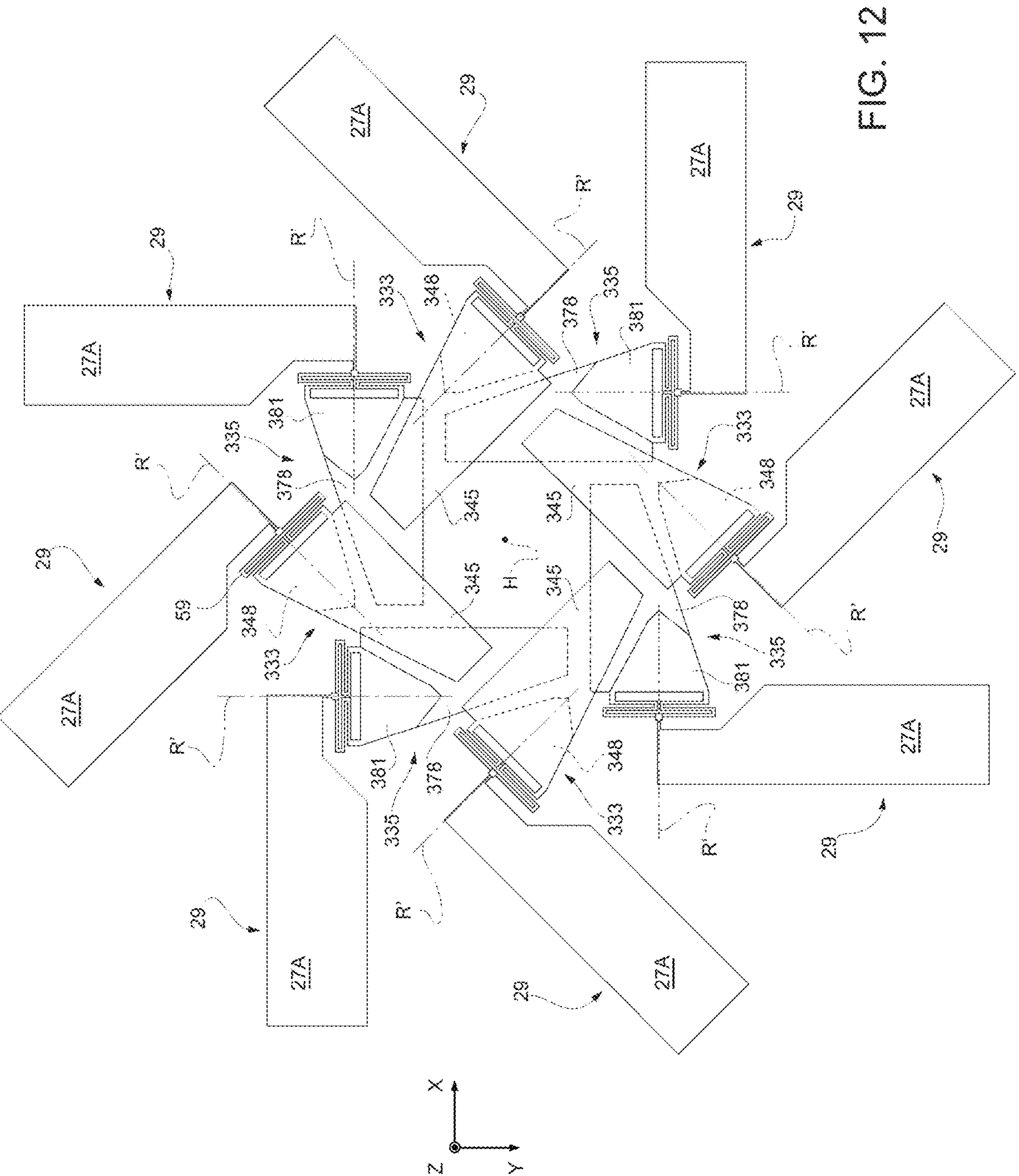
FIGS. 12 and 15 are schematic top plan views with portions removed of variants of the present MEMS shutter.

Irrespective of the type of embodiment, it is further possible for the first and second shielding structures, albeit maintaining an angularly alternating arrangement, to have a shape and/or arrangement different from what has been described, as illustrated, for example, in FIG. 12, where the first and second shielding structures are, respectively, designated by 333 and 335, and where, purely by way of example, actuation of a piezoelectric type has been assumed, even though also in this case a variant with electrostatic actuation (not illustrated) is possible. For this reason, in what follows the description is limited to the differences with respect to what has been explained in connection with the embodiment illustrated in FIG. 1A. Elements already present in the embodiment illustrated in FIG. 1A are designated by the same references, except where otherwise specified. Furthermore, in FIG. 12 and in the subsequent figures, the deformable coupling structures 59 are illustrated in a simplified way. Once again, FIG. 12 does not show that the first ends of the main portions 27A of the cantilever structures 29 are fixed with respect to corresponding portions of the fixed peripheral structure 28 (not illustrated in FIG. 12). In addition, for simplicity, FIG. 12 does not illustrate the couplings between the first and second shielding structures 333, 335 and, respectively, the first and second pillar regions, through the first and second planar springs. Finally, in what follows the terms "distal" and "proximal" are used to indicate parts of the shielding structures arranged, respectively, far from or near to the corresponding deformable coupling structures 59.

All this having been said, each one of the first and second shielding structures 333, 335 extends in a direction parallel to a respective direction of extension (designated, respectively, by R'). In particular, in resting conditions, both the first and the second shielding structures 333, 335 have a same mutual arrangement with respect to the corresponding directions of extension R'.

The directions of extension R', parallel to the plane XY, are co-planar and equidistant from the axis of symmetry H; in other words, in top plan view and in resting conditions, the directions of extension R' are to a first approximation tangential to a hypothetical circumference (not illustrated) centered on the axis of symmetry H. Furthermore, adjacent pairs of directions of extension R' form an angle equal to 45° so as to be angularly distributed over 360°.

For each shielding structure, the corresponding cantilever structure 29, the corresponding deformable coupling structure 59 and the corresponding actuator 36 have the same shapes and arrangements described in connection with the embodiment illustrated in FIG. 1A, except that they refer to the corresponding direction of extension R', instead of to the aforementioned radial direction R.

Figures 13A, 13B, 14A, 14B:
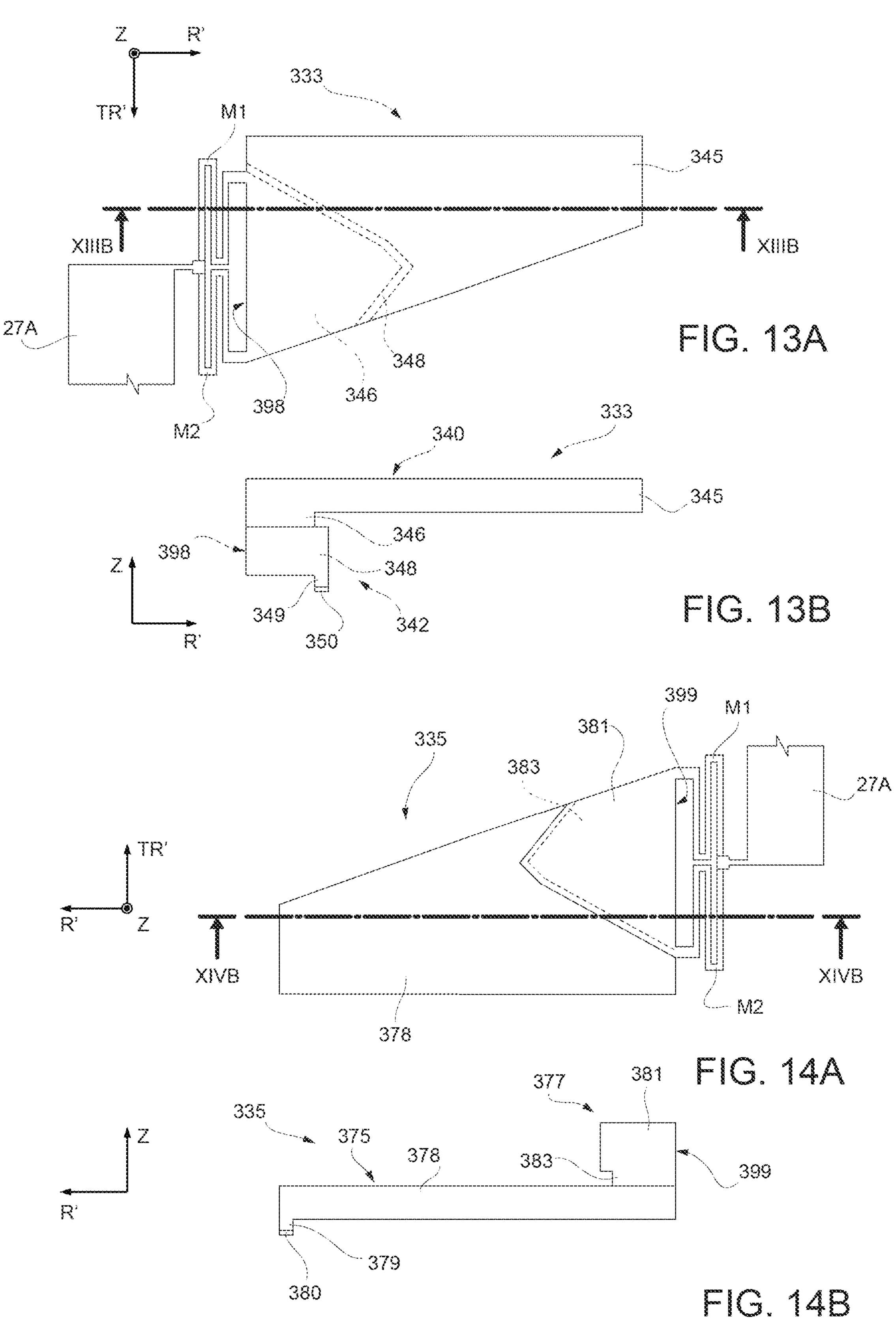
FIGS. 13A and 14A are schematic top plan views of portions of the MEMS shutter illustrated in FIG. 12.
FIGS. 13B and 14B are schematic cross-sectional views of portions of the MEMS shutter illustrated in FIG. 12, taken, respectively, along the lines of section XIIIB-XIIIB and XIVB-XIVB, represented, respectively, in FIGS. 13A and 14A.

The shape of the first shielding structures 333, which are the same as one another, is now described with reference to the first shielding structure 333 illustrated in FIGS. 13A and 13B; further, referred to as "transverse direction" (which is denoted by TR') is a direction perpendicular to the plane ZR'.

In detail, the main portion (designated by 345) of the top shielding region (designated by 340) is tapered in a direction parallel to the direction of extension R', i.e., it has an extension in the transverse direction TR' that decreases as the distance from the respective deformable coupling structure 59 increases.

In top plan view, the main portion (designated by 348) of the bottom secondary region (designated by 342) has approximately a wedge shape and, in addition to having, in a direction parallel to the direction of extension R', a maximum dimension smaller than the maximum dimension of the main portion 345 of the top shielding region 340, is also tapered in a direction parallel to the direction of extension R'. Furthermore, the maximum extension of the main portion 348 of the bottom secondary region 342 in a direction parallel to the transverse direction TR' is less than the maximum extension, in the same direction, of the main portion 345 of the top shielding region 340.

The secondary portion (designated by 346) of the top shielding region 340 has approximately the same shape, in top plan view, as the main portion 348 of the bottom secondary region 342, except for a recess. In other words, and without this implying any loss of generality, the secondary portion 346 overlies a proximal part of the main portion 348 of the bottom secondary region 342, leaving exposed a distal part of the main portion 348 of the bottom secondary region 342.

The secondary portion of the bottom secondary region 342 and the underlying suspended conductive region are designated, respectively, by 349 and 350.

In even greater detail, the main portion 345 of the top shielding region 340 extends in cantilever fashion from the secondary portion 346 of the top shielding region 340 so as to project beyond the main portion 348 of the bottom secondary region 342, not only in a direction parallel to the direction of extension R' but also in a direction parallel to the transverse direction TR' for reasons that will be clarified hereinafter. In other words, both a distal part and a proximal part of the main portion 345 of the top shielding region 340, which is referred to in what follows as the projecting proximal part of the main portion 345, are suspended and project laterally with respect to the underlying bottom secondary region 342.

The main portion 340 and the secondary portion 346 of the top shielding region 340 and the main portion 348 of the bottom secondary region 342 form a coupling wall 398, which is perpendicular to the direction of extension R'. Without this implying any loss of generality, the first and second elastic structures M1, M2 of the corresponding deformable coupling structure 59 are fixed with respect to portions of the coupling wall 398.

As regards the second shielding structures 335, which are the same as one another, their shape is now described with reference to the second shielding structure 335 illustrated in FIGS. 14A and 14B.

In detail, the main portion (designated by 378) of the bottom shielding region (designated by 375) has approximately the same shape as the main portions 345 of the top shielding regions 340, with respect to which it is vertically staggered.

The main portion (designated by 381) and the secondary portion (designated by 383) of the top secondary region (designated by 377) have approximately the same wedge shapes as the main portion 348 of the bottom secondary region 342 and as the secondary portion 346 of the top shielding region 340, respectively. Consequently, the main portion 381 of the top secondary region 377 overlies entirely the secondary portion 383, but leaves exposed a distal part and a proximal part of the main portion 378 of the bottom shielding region 375 (referred to in what follows as the exposed proximal part), which project, respectively, in the direction of extension R' and in the transverse direction TR'.

The secondary portion of the bottom shielding region 375 and the underlying suspended conductive region are designated, respectively, by 379 and 380.

The main portion 381 and the secondary portion 383 of the top secondary region 377 and the main portion 378 of the bottom shielding region 375 form a coupling wall 399, which is perpendicular to the direction of extension R'. Without this implying any loss of generality, the first and second elastic structures M1, M2 of the corresponding deformable coupling structure 59 are fixed with respect to portions of the coupling wall 399.

Thanks to the geometrical shapes of the first and second shielding structures 333, 335, in resting conditions there occurs what will be described hereinafter.

In detail, considering any first shielding structure 333, the distal part of the main portion 345 of the respective top shielding region 340 overlies, at a distance, the exposed proximal part of the main portion 378 of the bottom shielding region 375 of the second shielding structure 335 adjacent to the shielding structure 333 and arranged in a counter-clockwise direction.

In addition, the projecting proximal part of the main portion 345 of the top shielding region 340 overlies, at a distance, the distal part of the main portion 378 of the bottom shielding region 375 of the second shielding structure 335 adjacent to the shielding structure 333 and arranged in a clockwise direction.

Furthermore, the first and second shielding structures 333, 335 may translate in the respective directions of extension R', in the same way as described with reference to the previous embodiments, so as to reduce the area of overlapping between the shielding structures, and thus reduce occlusion of the underlying main aperture 9 (not illustrated in FIG. 12).

Figure 15:
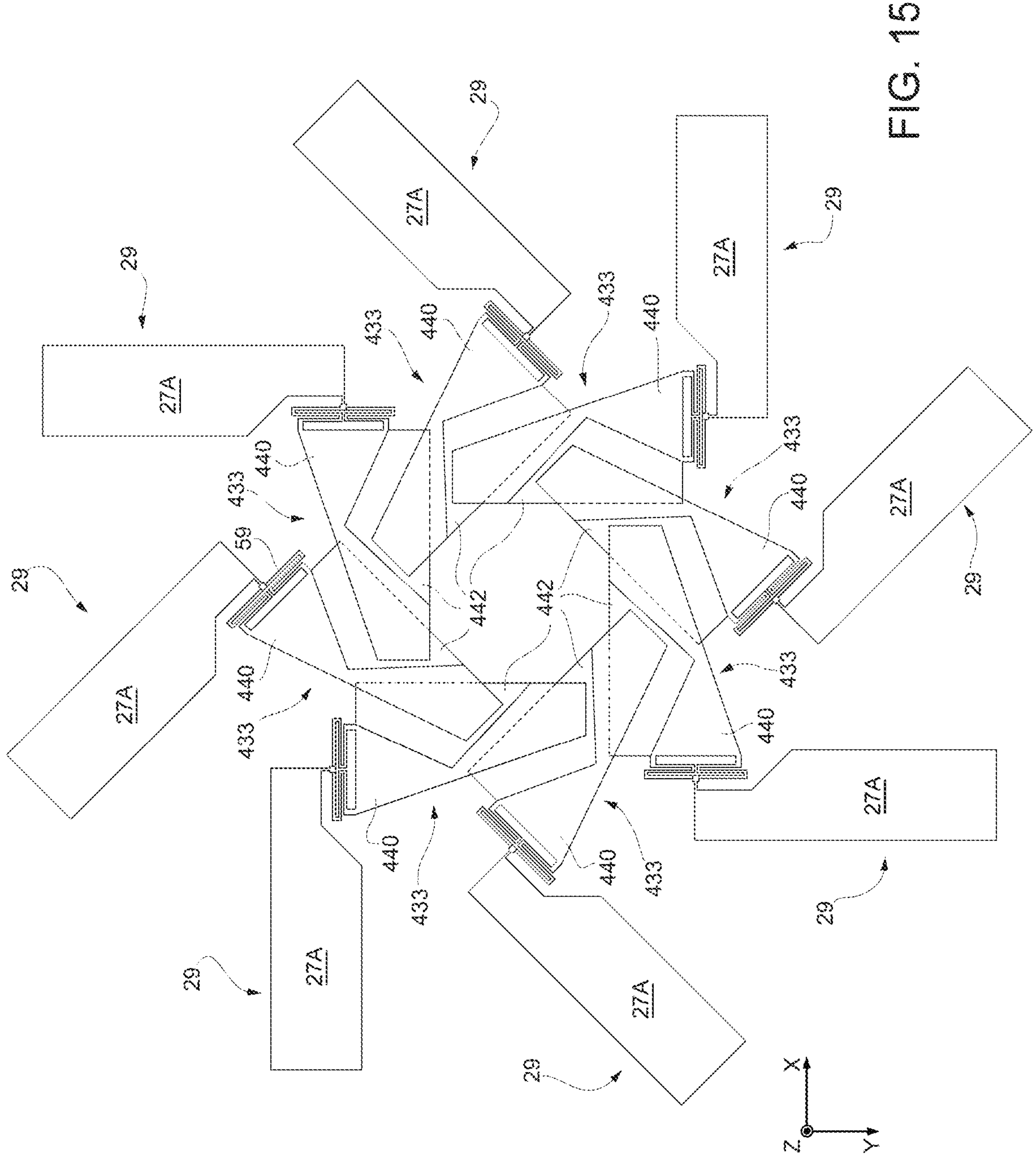

According to a further variant, the MEMS shutter 1 may be without the second shielding structures, as illustrated in FIG. 15, where the first shielding structures are designated by 433. Also in FIG. 15, the main aperture 9 is not illustrated. Not shown, for simplicity, are further the couplings between the first shielding structures 433 and corresponding pillar regions, provided by corresponding planar springs of the same type as described previously and formed indifferently by the first semiconductor layer 14 and/or by the second semiconductor layer 16.

This having been said, the MEMS shutter 1 differs from what is illustrated in FIG. 12 in that it includes eight first shielding structures 433, which are the same as one another and are spaced at equal angular distances apart (in resting conditions).

Figures 16A, 16B:
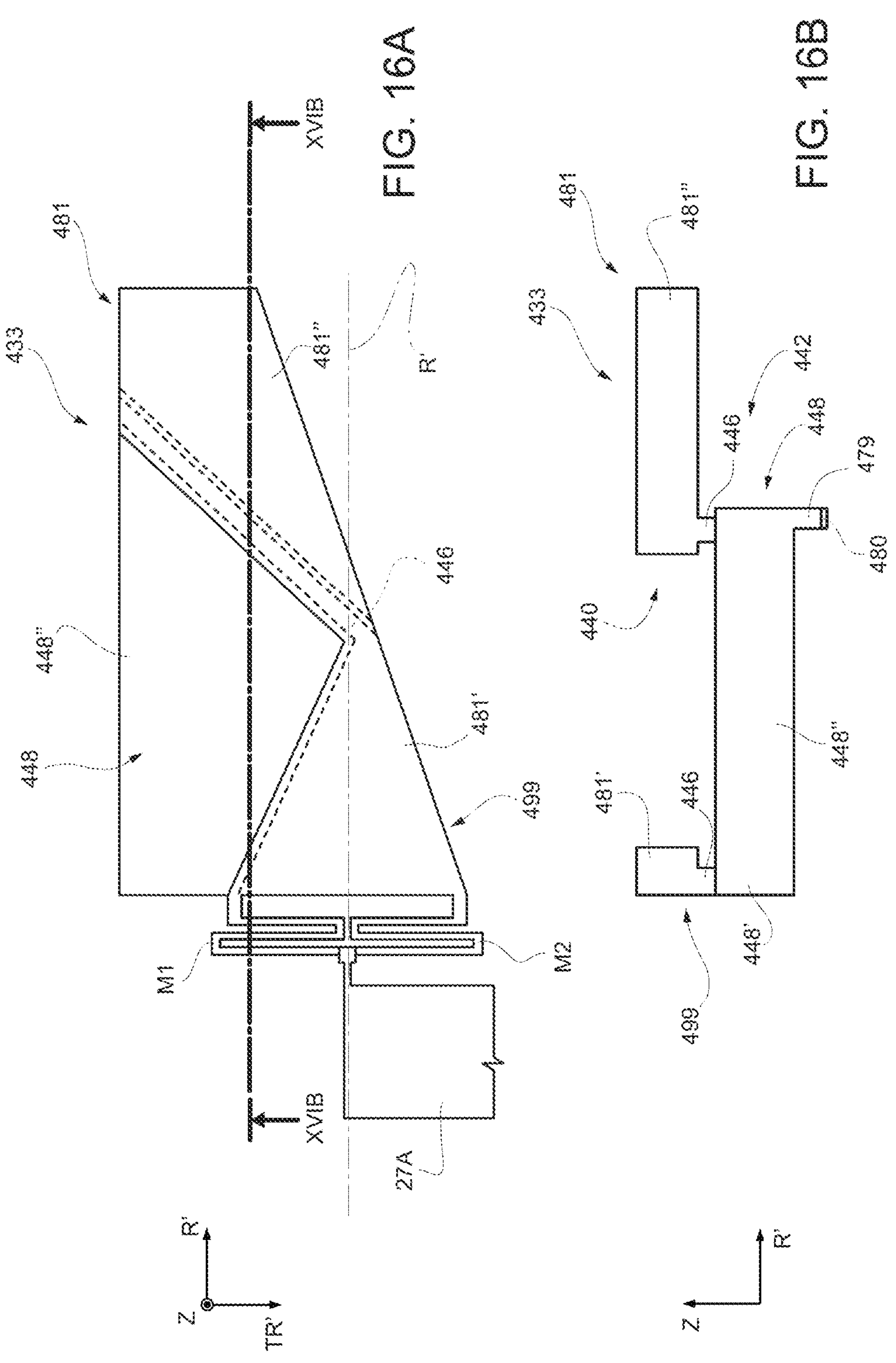
FIG. 16A is a schematic top plan view of a portion of the MEMS shutter illustrated in FIG. 15.
FIG. 16B is a schematic cross-sectional view of a portion of the MEMS shutter illustrated in FIG. 15, taken along a line of section XVIB-XVIB represented in FIG. 16A.

As illustrated in FIGS. 16A-16B, each first shielding structure 433 comprises a respective top shielding region 440, formed by the top inner structure 30 of the second semiconductor layer 16, and a respective bottom shielding region 442, formed by the bottom inner structure 22 of the first semiconductor layer 14.

The top shielding region 440 comprises a respective secondary portion 446 and a respective main portion 481; the bottom shielding region 442 comprises a respective main portion 448 and a respective secondary portion 479. The underlying suspended conductive region is designated by 480.

A proximal part 481' of the main portion 481 and the secondary portion 446 of the top shielding region 440 form, together with a first part 448' of the main portion 448 of the bottom shielding region 442, a main body 499; the first and second elastic structures M1, M2 of the deformable coupling structure 59 are fixed with respect to the main body 499.

A distal part 481" of the main portion 481 of the top shielding region 440 extends in cantilever fashion from the main body 499, approximately in the corresponding direction of extension R', projecting with respect to the underlying bottom shielding region 442.

A second part 448" of the main portion 448 of the bottom shielding region 442 is left exposed by the overlying top shielding region 440 and is laterally staggered with respect to the main body 499.

Thanks to the aforementioned shape of the first shielding structures 433, in resting conditions, as shown in FIG. 15, the distal part 481" of the main portion 481 of the top shielding region 440 of any first shielding structure 433 overlies, at a distance, the second part 448" of the main portion 448 of the bottom shielding region 442 of the first shielding structure that is adjacent and arranged in a counterclockwise direction. Furthermore, the second part 448" of the main portion 448 of the bottom shielding region 442 of any first shielding structure 433 is overlaid, at a distance, by the distal part 481" of the main portion 481 of the top shielding region 440 of the first shielding structure that is adjacent and arranged in a clockwise direction. In these conditions, occlusion of the underlying main aperture 9 is maximum since, in top plan view, there is no solution of continuity between the first shielding structures.

The first shielding structures 433 may translate in the respective directions of extension R' so as that the distal parts 481" of the main portions 481 of the top shielding region 440 become laterally separate from, i.e., no longer overlying, the adjacent shielding structures. In other words, in top plan view, there is solution of continuity between the first shielding structures 433; i.e., occlusion of the underlying main aperture 9 decreases.

Figure 11:
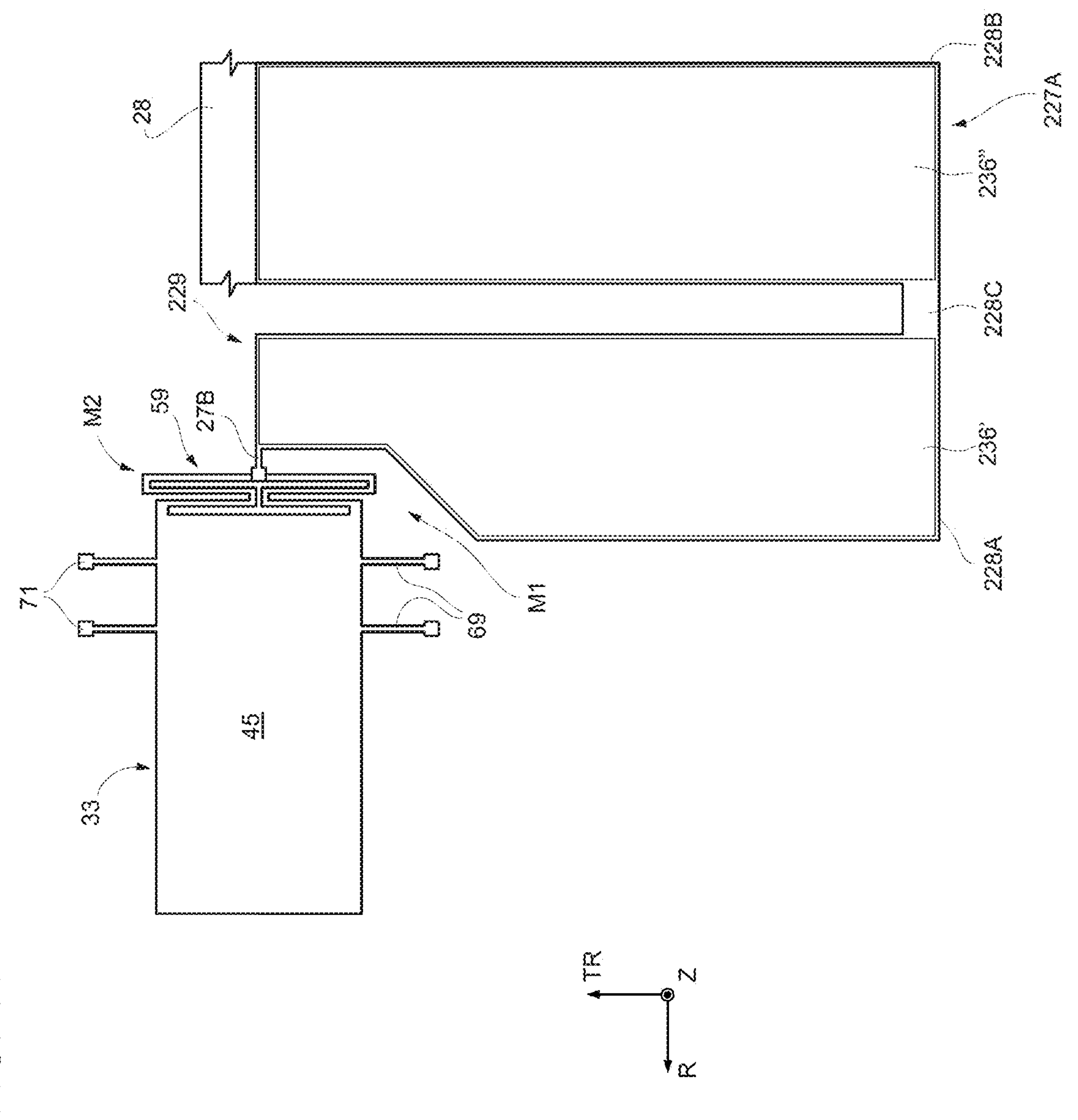
FIG. 11 is a schematic top plan view with portions removed of a part of a further variant of the present MEMS shutter.

Albeit not illustrated, variants are further possible where the MEMS shutter 1 is of the same type as what is illustrated in FIG. 12 or FIG. 15, but where the piezoelectric actuation is of a bidirectional type, as shown in FIG. 11, or else is of an electrostatic type, in which case the shielding structures are coupled to corresponding coupling bodies. For instance, with reference to the variant illustrated in FIGS. 12, 13A-13B and 14A-14B, the coupling bodies may be fixed with respect to the aforementioned coupling walls 398, in the case of the first shielding structures 333, and to the aforementioned coupling walls 399, in the case of the second shielding structures 335.

The present MEMS shutter 1 may be manufactured using the process described hereinafter with reference, for example, to the embodiment illustrated in FIG. 1A.

Figures 17, 18, 19:
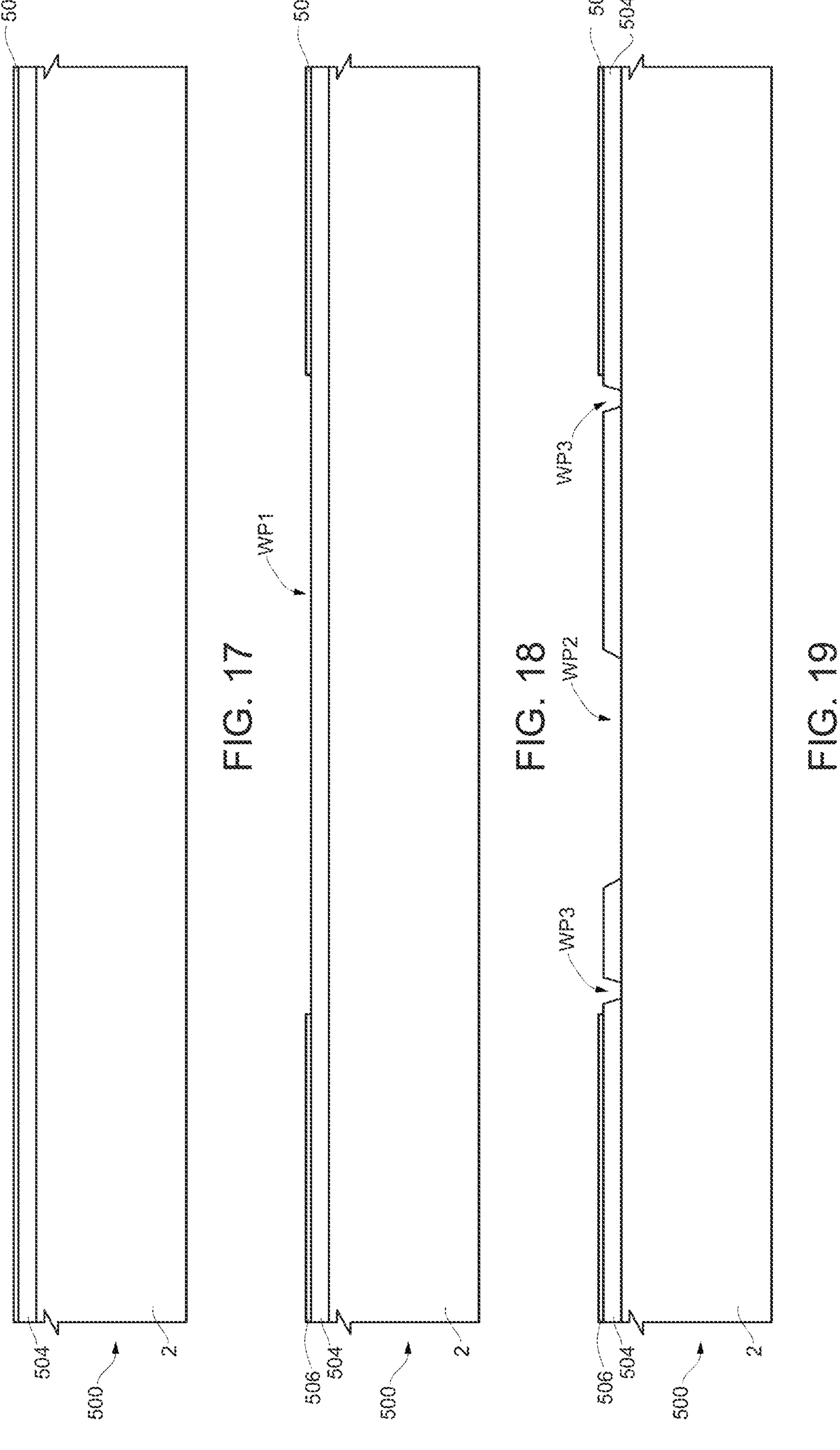
FIGS. 17-31 are schematic cross-sectional views of a semiconductor wafer during successive steps of a manufacturing process.

As illustrated in FIG. 17, the present process initially envisages forming a first dielectric layer 504 and a second dielectric layer 506 on the substrate 2 of a semiconductor wafer 500; the first and second dielectric layers 504, 506 are made, respectively, of thermal oxide and aluminum oxide.

Next, as illustrated in FIG. 18, a part of the second dielectric layer 506 is selectively removed so as to form a first preliminary opening WP1 through the second dielectric layer 506 in order to expose a part of the first dielectric layer 504.

Then, as illustrated in FIG. 19, portions of the exposed part of the first dielectric layer 504 are selectively removed so as to form, through the first dielectric layer 504, a second preliminary opening WP2 and a third preliminary opening WP3, which is shaped like a trench and surrounds laterally, at a distance, the second preliminary opening WP2.

Figures 20, 21, 22:
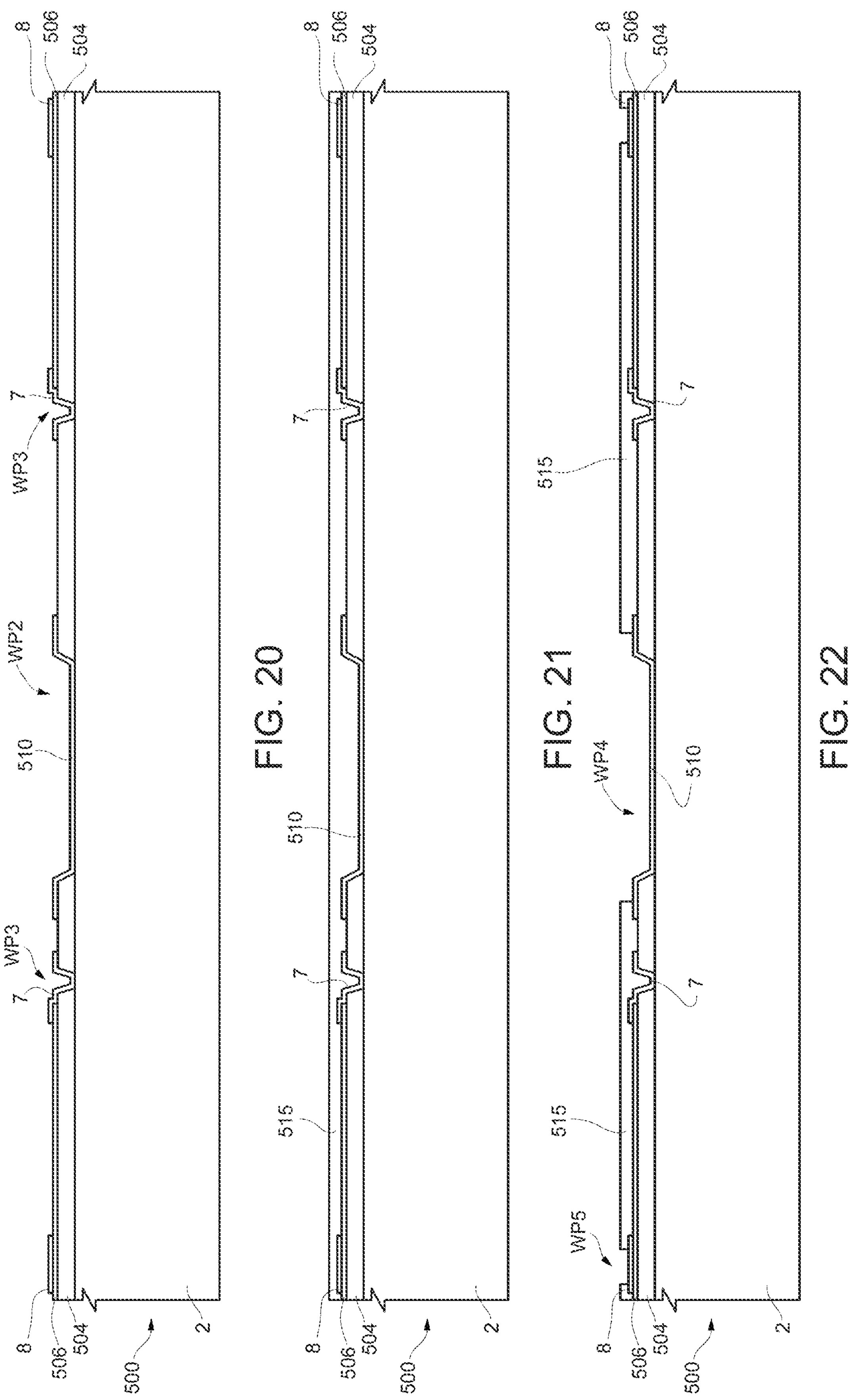

Next, as illustrated in FIG. 20, polysilicon is deposited, followed by selective etching so that the residual polysilicon forms the conductive layer 7, within the third preliminary opening WP3, as well as the anchorage regions 8 and an intermediate conductive region 510, which extends in the second preliminary opening WP2, in contact with the substrate 2, as well as on portions of the first dielectric layer 504 that laterally delimit the second preliminary opening WP2. The conductive layer 7 and the intermediate conductive region 510 are separated from one another laterally; consequently, the aforementioned operations of deposition of polysilicon and of subsequent etching leave exposed parts of the first dielectric layer 504, which are laterally staggered with respect to the conductive layer 7 and to the intermediate conductive region 510. Furthermore, portions of the second semiconductor layer 506 arranged on the outside of the conductive layer 7 and laterally staggered with respect to the anchorage regions 8 remain exposed.

Next, as illustrated in FIG. 21, a first sacrificial region 515 is formed and then planarized (step not represented in detail) on the conductive layer 7, on the anchorage regions 8, and on the intermediate conductive region 510, as well as on the exposed portions of the first and second dielectric layers 504, 506. In particular, the first sacrificial region 515 is made of TEOS oxide laid by chemical-vapor deposition.

Then, as illustrated in FIG. 22, an etch is made for selective removal of portions of the first sacrificial region 515 that are arranged on the anchorage regions 8 and on the intermediate conductive region 510. In particular, a corresponding fourth preliminary opening WP4 is formed, which passes through the first sacrificial region 515 and gives out onto an inner portion of the intermediate conductive region 510, which is exposed. Without this implying any loss of generality, this inner portion of the intermediate conductive region 510 includes, in addition to the part of the intermediate conductive region 510 arranged in contact with the substrate 2, also parts of the intermediate conductive region 510 that extend on the first dielectric layer 504. Furthermore, fifth preliminary openings WP5 are formed, which pass through the first sacrificial region 515 and give out onto corresponding anchorage regions 8.

Figure 23:
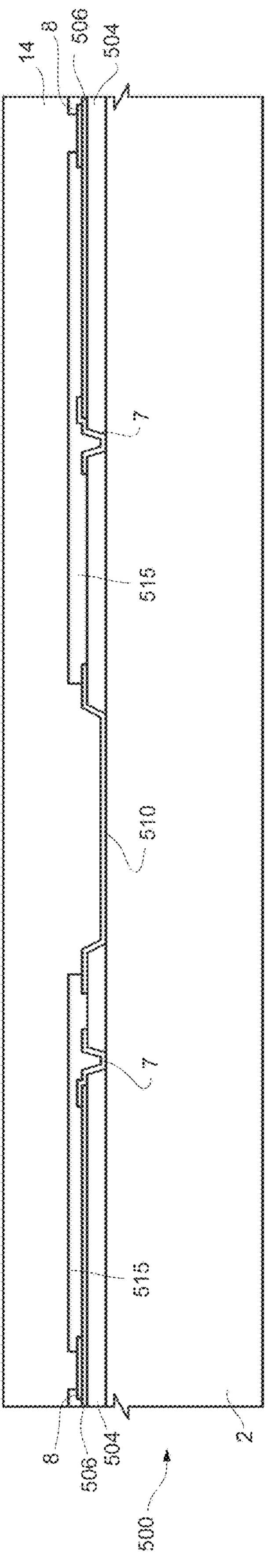

Next, as illustrated in FIG. 23, a first epitaxial growth of silicon is carried out so as to form, and then planarize (step not represented in detail), the first semiconductor layer 14, which is made, as has been said, of polycrystalline silicon, and extends on the first sacrificial region 515, as well as within the fourth preliminary opening WP4, in direct contact with the intermediate conductive region 510, and within the fifth preliminary openings WP5, in direct contact with the anchorage regions 8. In particular, the portions of the first semiconductor layer 14 that extend within the fifth preliminary openings WP5 form the aforementioned supporting regions 18, i.e., the anchorages of the first semiconductor layer 14.

Figure 24:
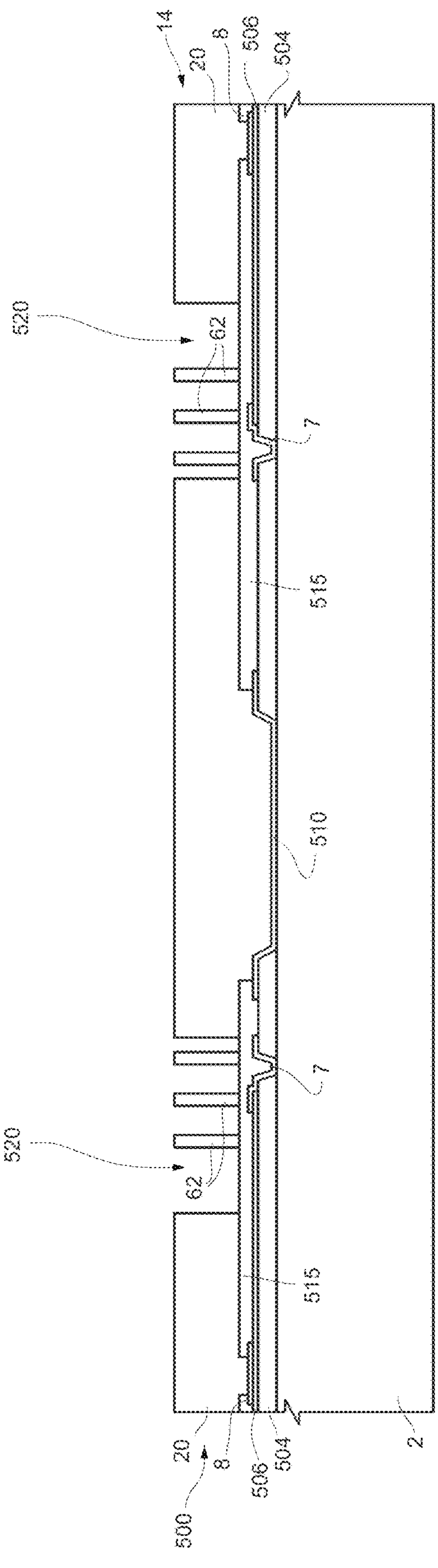

As illustrated in FIG. 24, using a mask (not illustrated) portions of the first semiconductor layer 14 that are laterally staggered with respect to the anchorage regions 8 and to the intermediate conductive region 510 are then removed in a selective way so as to form a plurality of first process openings 520, which pass through the first semiconductor layer 14 and are delimited at the bottom by corresponding portions of the first sacrificial region 515.

The first process openings 520 laterally delimit the portions of the first semiconductor layer 14 that form the bottom peripheral region 20 and the deformable coupling structures 59 (in particular, the bottom elongated portions 62 of the elongated structures of the elastic structures).

Figure 25:
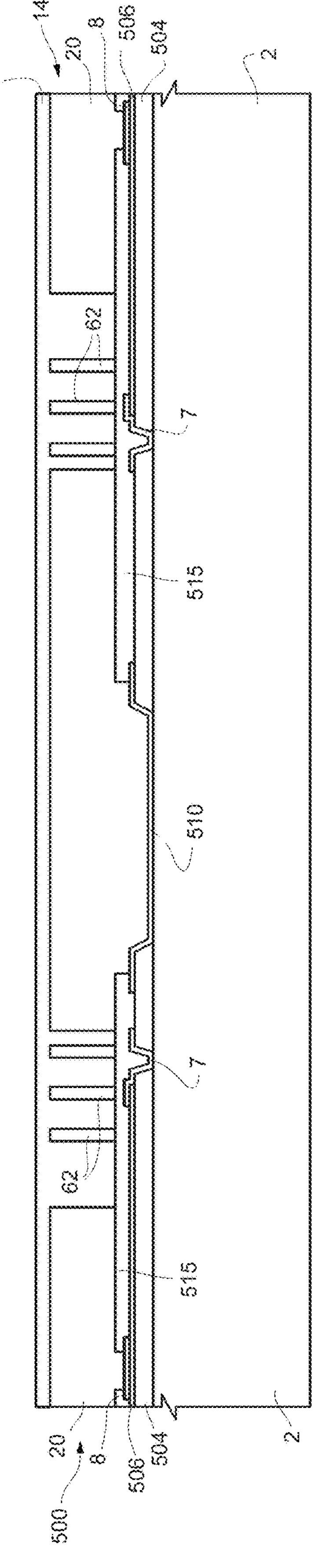

Next, as illustrated in FIG. 25, a second sacrificial region 525 is formed by chemical-vapor deposition, the second sacrificial region 525 being formed by TEOS oxide and extending on the first semiconductor layer 14, as well as within the first process openings 520 until it comes into contact with the portions of the first sacrificial region 515 that delimit at the bottom the first process openings 520.

Figure 26:
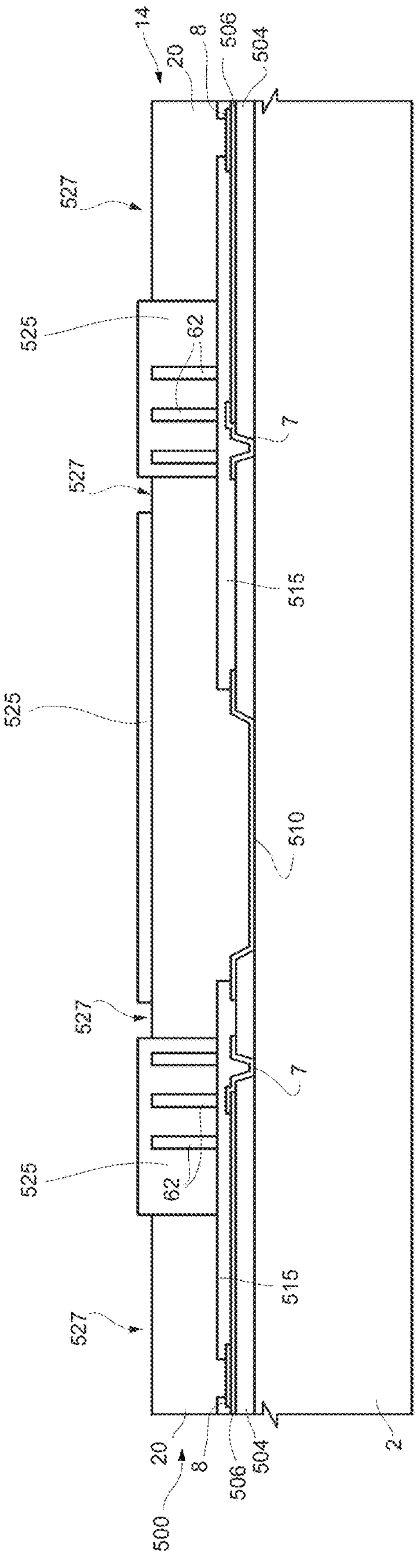

Then, as illustrated in FIG. 26, a selective etch is made so as to remove portions of the second sacrificial region 525 that are arranged on the first semiconductor layer 14 and thus laterally staggered with respect to the first process openings 520. In particular, anchorage openings 527 are formed, which are delimited at the bottom by corresponding portions of the first semiconductor layer 14.

Figure 27:
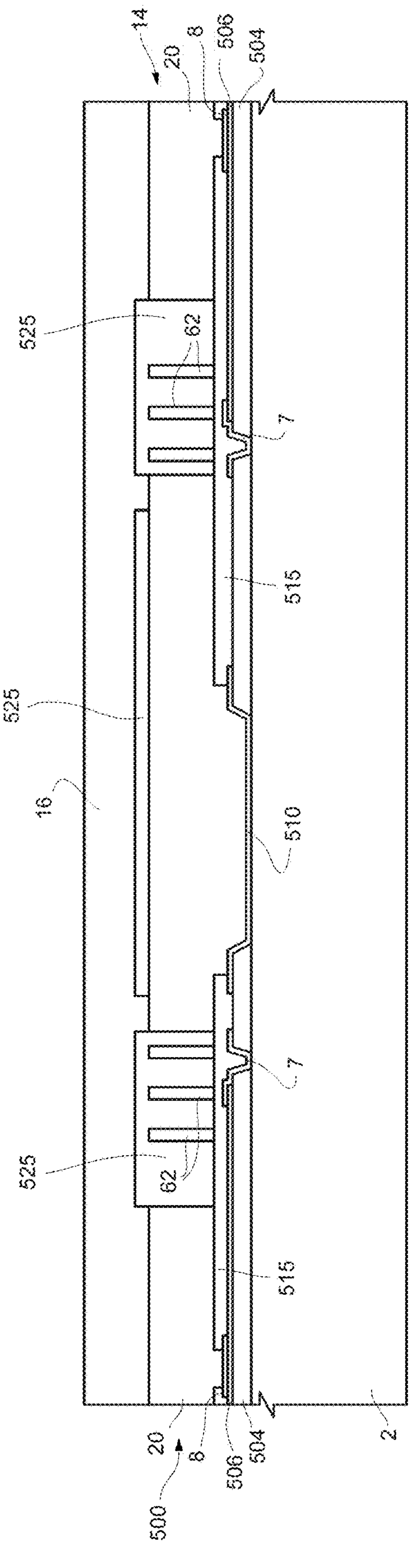

Next, as illustrated in FIG. 27, a second epitaxial growth of silicon is carried out so as to form, and then planarize (step not represented in detail), the second semiconductor layer 16, which is made, as has been said, of polycrystalline silicon and extends on the second sacrificial region 525, as well as within the anchorage openings 527 so as to contact the portions of the first semiconductor layer 14 that delimit at the bottom the anchorage openings 527. The portions of the second semiconductor layer 16 that contact the first semiconductor layer 14 are to form the top peripheral region 26 and part of the deformable coupling structures 59 (in particular, part of the transverse portions 64 of the elongated structures of the elastic structures), in addition to the secondary portions 46 of the top shielding regions 40 of the first shielding structures 33 and the secondary portions 83 of the top secondary regions 77 of the second shielding structures 35.

Figure 28:
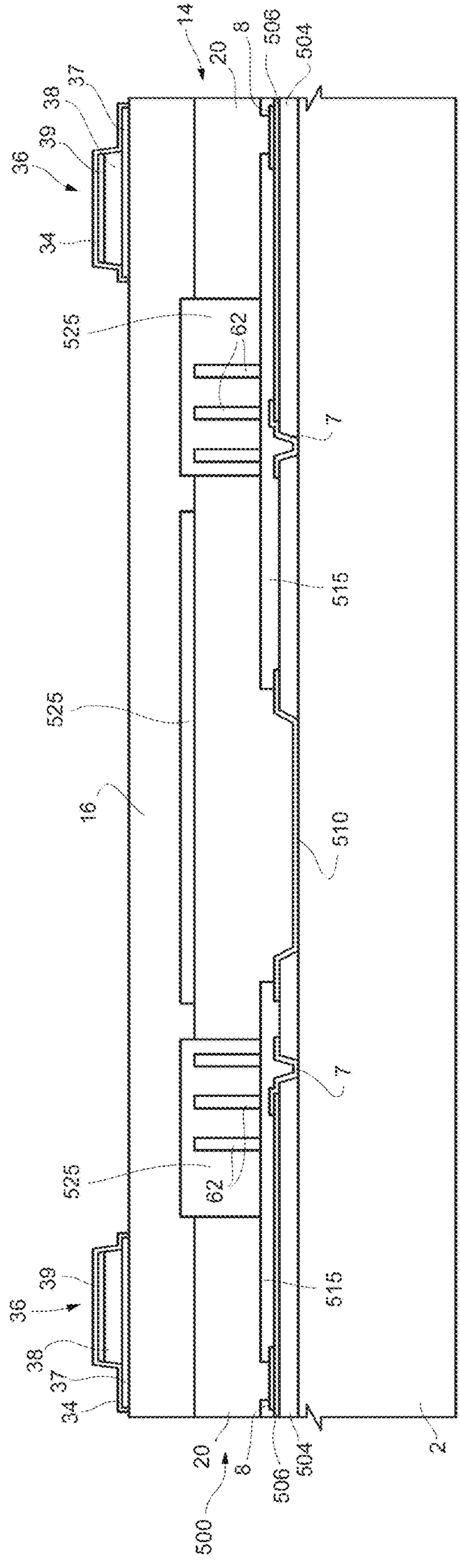

Then, in a per se known manner the actuators 36 are formed, as illustrated in FIG. 28.

Figure 29:
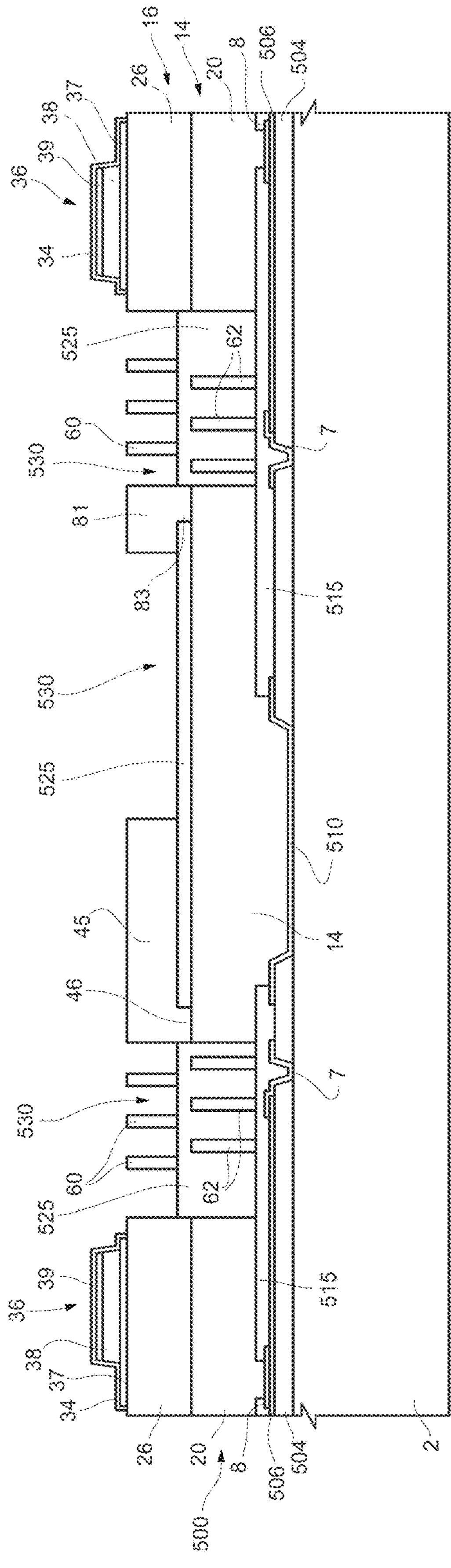

Next, as illustrated in FIG. 29, a selective etch is performed using a mask (not illustrated) so as to remove portions of the second semiconductor layer 16 and form second process openings 530, which traverse the second semiconductor layer 16 and are delimited at the bottom by corresponding portions of the second sacrificial region 525.

In practice, the second process openings 530 laterally delimit the portions of the second semiconductor layer 16 that form the top peripheral region 26 and the top elongated portions 60 of the elongated structures of the elastic structures. Furthermore, the second process openings 530 laterally delimit the main portions 45 of the top shielding regions 40 of the first shielding structures 33 and the main portions 81 of the top secondary regions 77 of the second shielding structures 35.

Figure 30:
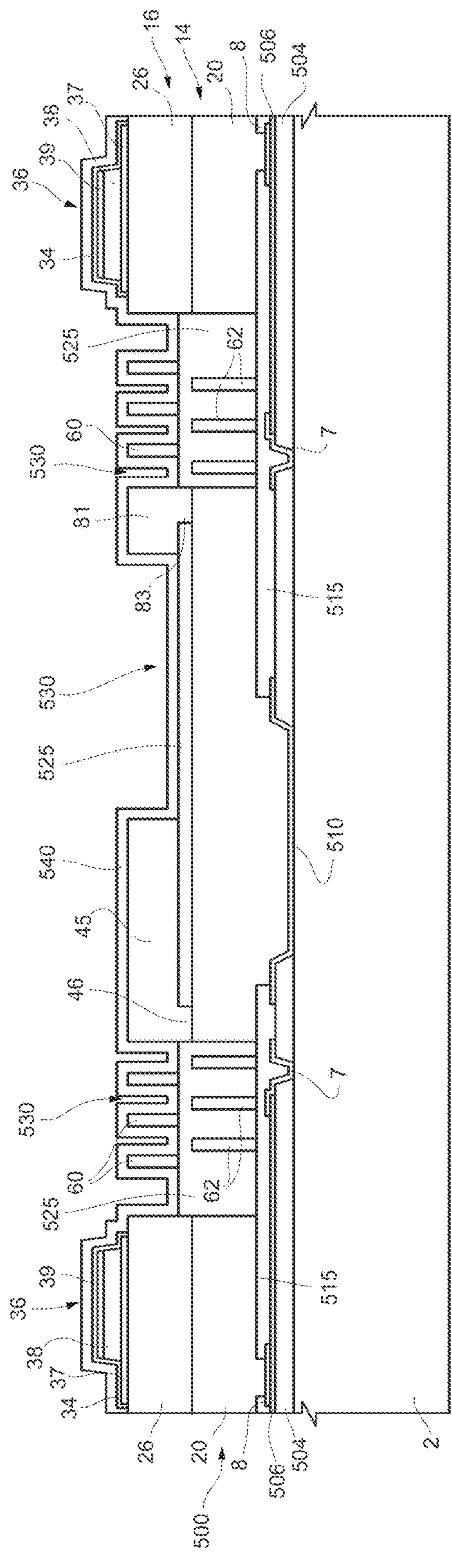

Next, as illustrated in FIG. 30, on the semiconductor wafer 500, a protection layer 540 is formed, for example by deposition of TEOS oxide. The protection layer 540 extends on the protective regions 34 of the actuators 36, on the exposed portions of the second semiconductor layer 16, and within the second process openings 530 until it comes into contact with the portions of the second sacrificial region 525 that delimit at the bottom the second process openings 530.

Figure 31:
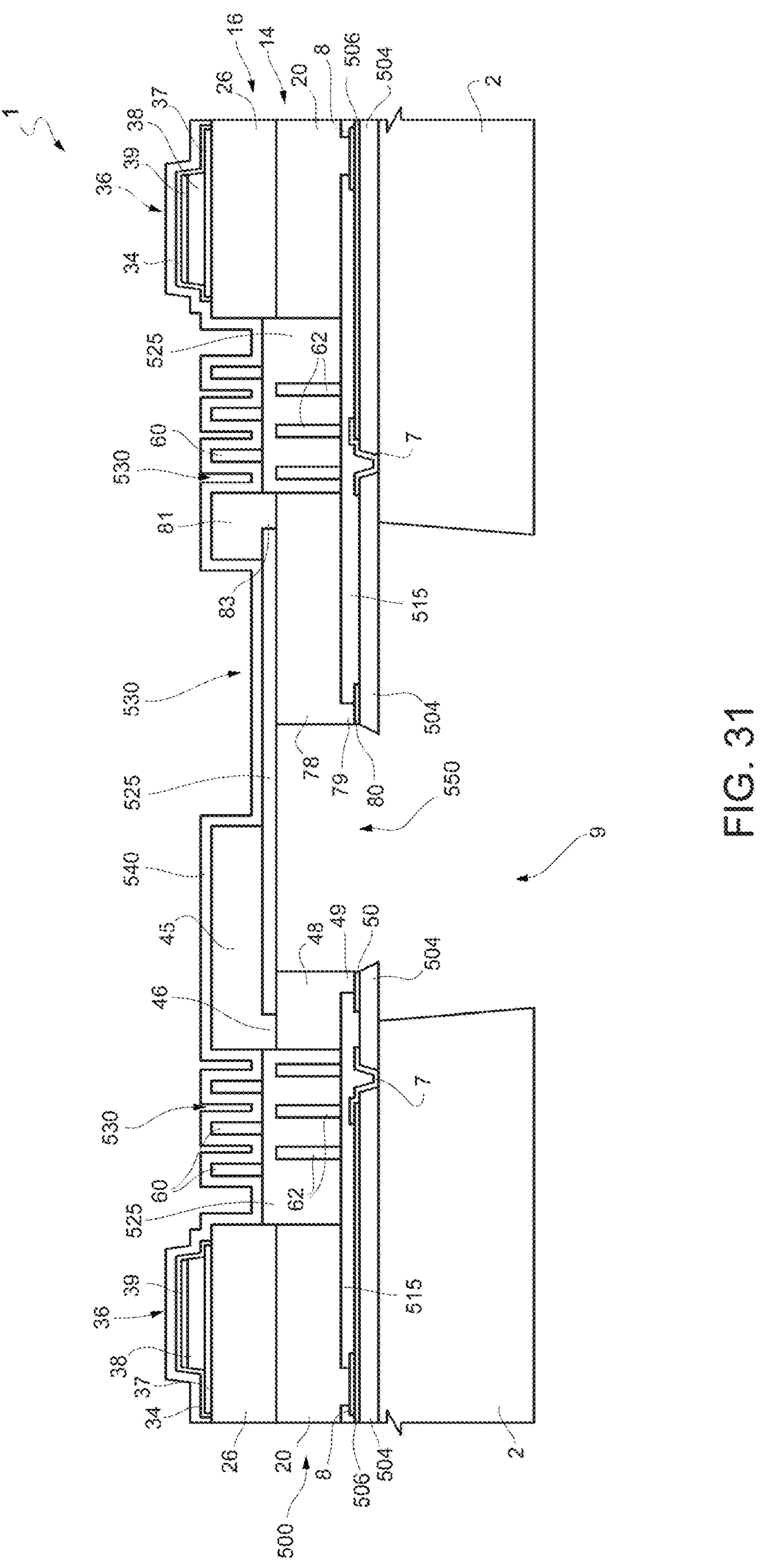

Then, as illustrated in FIG. 31, using a respective mask (not illustrated), a backside etch of the substrate 2 is performed for selective removal of portions of the substrate 2 arranged underneath the intermediate conductive region 510 and forming the main aperture 9.

In particular, the etch is of a dry type (for example, sulphur hexafluoride is used) and is guided, as well as by the aforementioned mask, by the part of the intermediate conductive region 510 that contacts the substrate 2 since etching is not able to remove portions of the first dielectric layer 504. Consequently, in addition to the aforementioned part of the intermediate conductive region 510 that contacts the substrate 2, an overlying portion of the first semiconductor layer 14 is selectively removed. In this way, an intermediate opening 550 is formed, which extends through the first semiconductor layer 14 and the first dielectric layer 504 and communicates with the underlying main aperture 9.

At each of the first shielding structures 33, the intermediate opening 550 is overlaid by a portion of the second sacrificial region 525 arranged underneath the main portion 45 of the corresponding top shielding region 40; this portion of the second sacrificial region 525 enables, in fact, a local etch stop, before the main portion 45 gets damaged.

Furthermore, the etching mask is such that also portions of the substrate 2 are removed that are laterally staggered with respect to the overlying intermediate conductive region 510, said portions being delimited at the top by corresponding portions of the first dielectric layer 504. In this way, the main aperture 9 is partially closed, at the top, by these portions of the first dielectric layer 504, which are laterally staggered with respect to the part of the intermediate conductive region 510 in contact with the substrate 2. These portions of the first dielectric layer 504 are in turn surrounded laterally by the conductive layer 7. In practice, these portions of the first dielectric layer 504 partially close the top mouth of the main aperture 9, understood as the area of the main aperture 9 in the plane of the top surface $S_a$ of the substrate 2.

In particular, for each second shielding structure 35, the main aperture 9 is partially occluded by a corresponding portion of the first dielectric layer 504, which is overlaid by a corresponding portion of the first sacrificial region 515 arranged underneath the main portion 78 of the corresponding bottom shielding region 75. The aforesaid corresponding portion of the first dielectric layer 504 protects from etching the corresponding bottom shielding region 75.

At the end of the operations illustrated in FIG. 31, the remaining portions of the first semiconductor layer 14 form the bottom secondary regions 42 of the first shielding structures 33 and the bottom shielding regions 75 of the second shielding structures 35. The remaining portions of the intermediate conductive region 510 form the suspended conductive regions 50, 80. In this connection, in FIG. 31 it may be noted how the suspended conductive regions 50, 80 project slightly outwards, with respect to the corresponding secondary portions 49, 79; this detail is irrelevant for the purposes of operation of the MEMS shutter 1 and, for simplicity of representation, has not been illustrated in the other figures. Furthermore, the degree of the projection may be much smaller (substantially negligible) than what is illustrated in FIG. 31.

Next, an etch is made using hydrofluoric acid, which enables removal of the protection region 540 and the first and second sacrificial regions 515, 525, which are in contact with one another. Furthermore, the aforementioned portions of the first dielectric layer 504 that in part closed, at the top, the main aperture 9 are removed. These portions of the first dielectric layer 504 are removed because they are not protected by the aluminum oxide of the second dielectric layer 506. In this way, the first and second shielding structures 33, 35 are released, as well as the corresponding cantilever structures 29 and the corresponding deformable coupling structures 59, thus obtaining what is illustrated in FIG. 1A. The residual portions of the first and second dielectric layers 504, 506 form, respectively, the first and second dielectric regions 4, 6.

In general, the manufacturing process described may be used also for the manufacture of the other embodiments, as for example the embodiments with electrostatic actuation. In this connection, with reference, for example, to the embodiment illustrated in FIGS. 8-10, formation of the first and second shielding structures 33, 35 is performed in the same way as described previously. In addition, formation of the first sacrificial region 515 and the subsequent formation of the first process openings 520 through the first semiconductor layer 14 enables definition of the parts of the third planar springs 169 and of the coupling body 100 formed by the first semiconductor layer 14, in addition to the parts of the first and second stator regions ST1, ST2 formed by the first semiconductor layer 14. Formation of the second process openings 530 through the second semiconductor layer 16 enables definition of the parts of the third planar springs 169 and of the coupling body 100 formed by the second semiconductor layer 16, in addition to the parts of the first and second stator regions ST1, ST2 formed by the second semiconductor layer 16.

Figure 32:
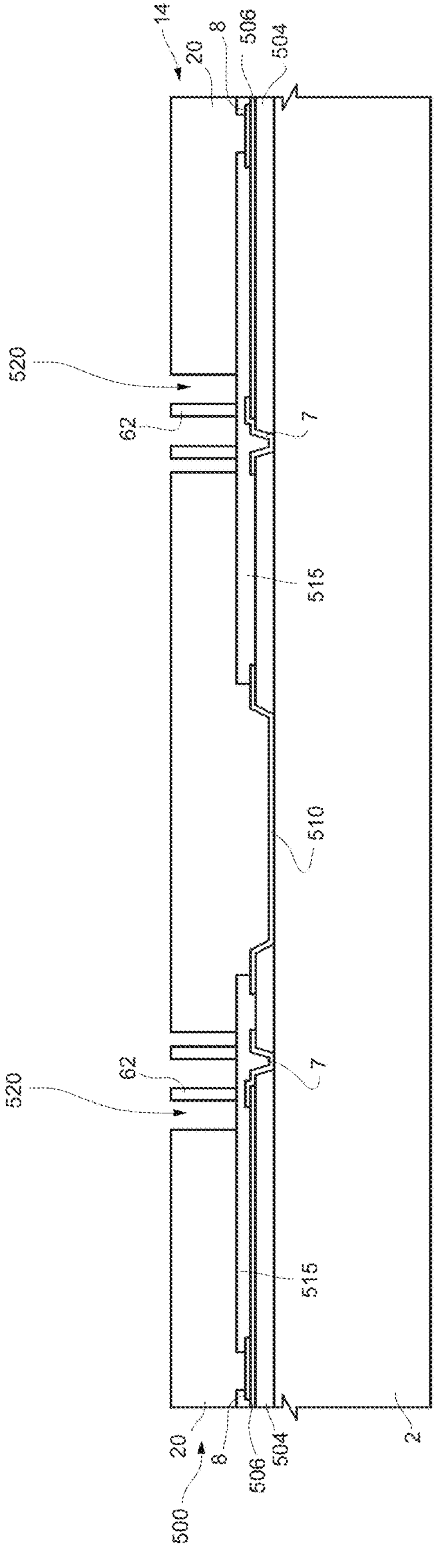
FIGS. 32 and 33 are schematic cross-sectional views of a semiconductor wafer during successive steps of a variant of the manufacturing process.
Figure 33:
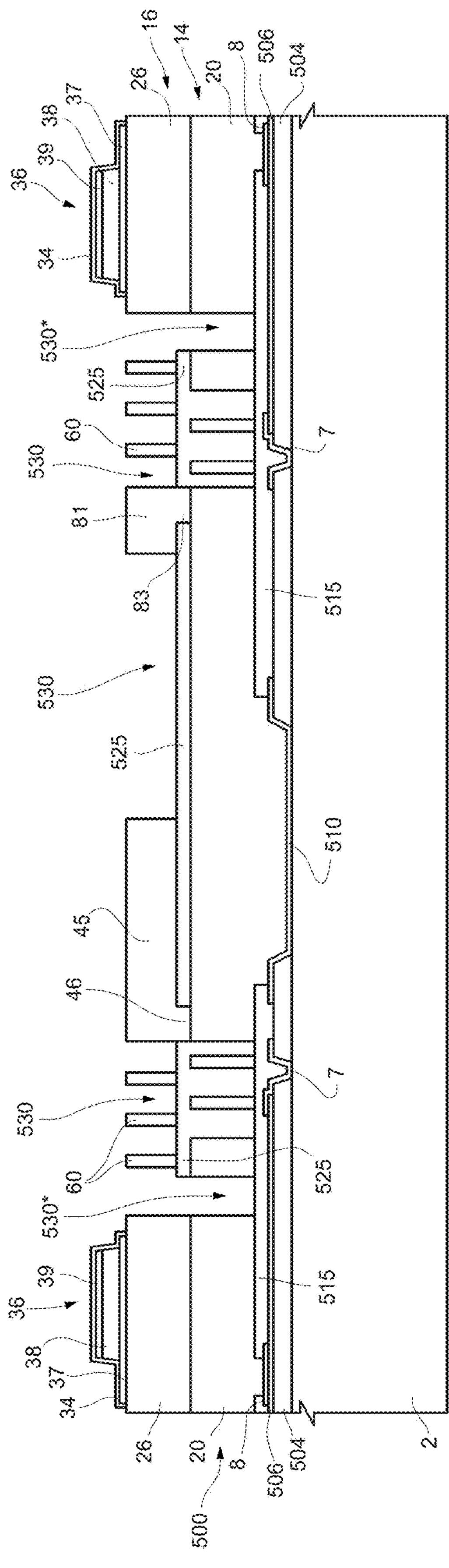

Further possible variants are where, for example, etching of the first semiconductor layer 14, mentioned previously with reference to FIG. 24, with formation of the first process openings 520, does not entail definition of (for example) the bottom peripheral region 20, as illustrated in FIG. 32. In this case, the bottom peripheral region 20 may be defined during the subsequent etching of the second semiconductor layer 16, which is performed so as to cause also removal of underlying portions of the first semiconductor layer 14. For this purpose, as illustrated in FIG. 33, patterning of the second sacrificial region 525, described previously with reference to FIG. 26, and the mask (not illustrated and mentioned with reference to FIG. 29) used during selective etching of the second semiconductor layer 16 are such that the latter etching causes formation, not only of the second process openings 530, but also of deep openings 530*, which traverse both the first semiconductor layer 14 and the second semiconductor layer 16 and are delimited at the bottom by the first sacrificial region 515. Furthermore, albeit not illustrated, in the case of the variants where etching of the second semiconductor layer 16 also involves removal of underlying portions of the first semiconductor layer 14, until portions of the first sacrificial region 515 are exposed, the protection layer 540 may extend within the deep openings 530* until it comes into contact with the aforesaid portions of the first sacrificial region 515. In addition, in general, the deep openings 530* may be used to define parts of the MEMS shutter 1 formed both by the first semiconductor layer 14 and by the second semiconductor layer 16, such as the aforementioned transverse portions 64.

The advantages that the present solution affords emerge clearly from the foregoing description.

In particular, the present MEMS shutter 1 may be controlled electrically so as to vary the optical aperture with a large number of degrees of freedom. In fact, it is possible to shield selectively a large number of perimetral portions of the main aperture 9 by translations of corresponding shielding structures. The fact that the shielding structures are patterned on two different levels enables optimization of the angular arrangement of the shielding structures themselves. In this connection, in general the effect of the movement of the shielding structures on the optical aperture also depends upon the profile of the underlying main aperture 9, which represents a further degree of freedom available to the designer.

Finally, it is clear that modifications and variations may be made to the manufacturing process and to the MEMS shutter described and illustrated herein, without thereby departing from the scope of the present disclosure, as defined in the annexed claims.

For instance, the shape of the shielding structures, the fixed peripheral structure, the cantilever structures, the deformable coupling structures (in the case of piezoelectric actuation), and the coupling bodies and stator regions (in the case of electrostatic actuation) may be different from what has been described. For instance, the stator regions may in turn include cantilever portions.

Figure 34:
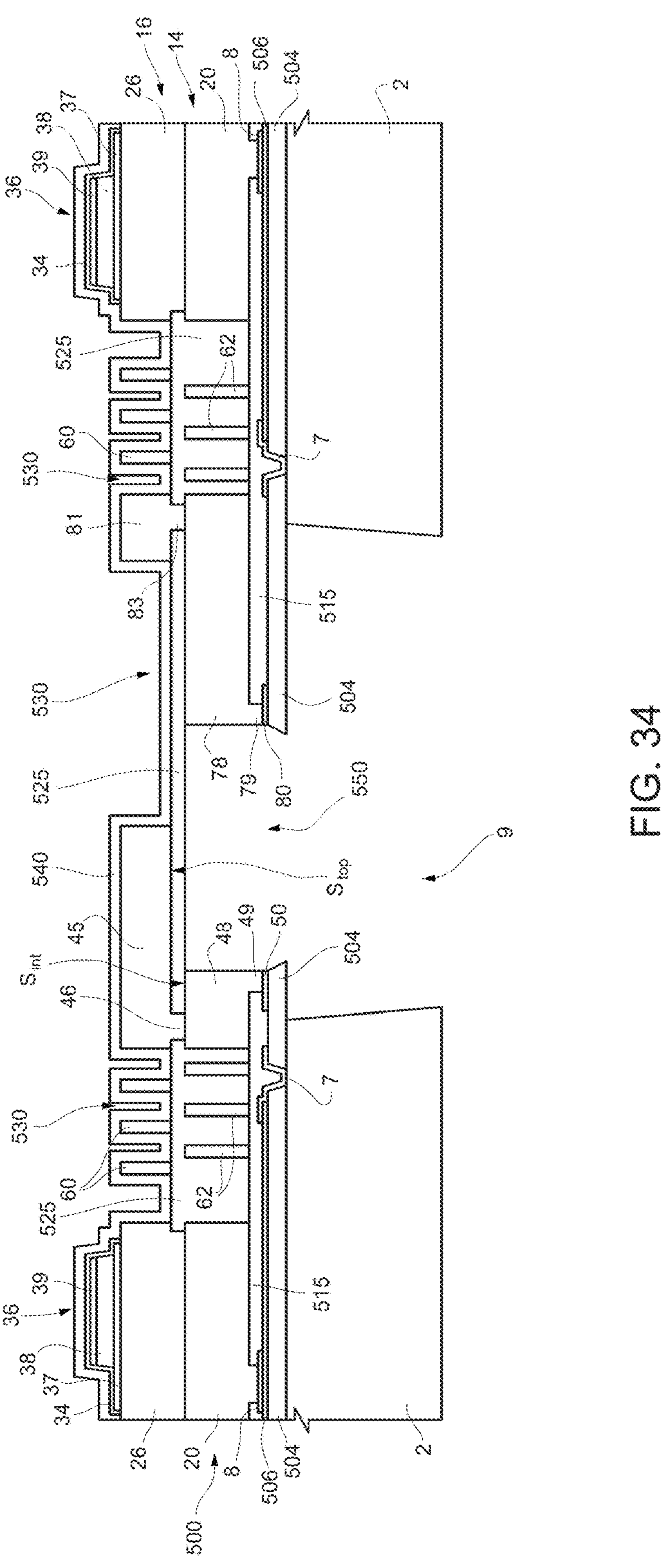
FIG. 34 is a further schematic cross-sectional view of a semiconductor wafer during a manufacturing process.

Furthermore, the alignments of the different regions during the manufacturing process may be different from what has been described, for example on account of the typical tolerances of the etching processes, such as the ones that lead to formation of the anchorage openings 527, illustrated in FIG. 27. It is thus, for example, possible for there be obtained what is illustrated in FIG. 34, which regards the same step of the manufacturing process as that shown in FIG. 31.

In detail, if by top surface $S_{top}$ is designated the top surface of the second sacrificial region 525, the parts of the top peripheral region 26 and of the top inner structure 30 (formed by the second semiconductor layer 16) that are located on the top surface $S_{top}$ protrude slightly from the respective underlying portions arranged between the top surface $S_{top}$ and the surface (designated by $S_{int}$) that geometrically separates the first and second semiconductor layers 14, 16.

Once again with reference to the manufacturing process, the polysilicon that forms the first and second semiconductor layers 14, 16 may be formed in a per se known manner, for example by epitaxial growth starting from exposed portions (not illustrated) of the substrate 2 and, respectively, of the first semiconductor layer 14, in order to speed up growth thereof and increase the thicknesses of the first and second semiconductor layers 14, 16. In this connection, in general, both the first semiconductor layer 14 and the second semiconductor layer 16 may have a thickness comprised, for example, between 1 μm and 80 μm.

It is further possible for the second dielectric layer 506, and thus the second dielectric region 6, to be made of a material resistant to hydrofluoric acid, different from aluminum oxide (for example, silicon nitride).

The number, shape, and arrangement of the pillar regions and of the planar springs may be different from what has been described. Likewise, the points of the shielding structures or of the coupling bodies to which the planar springs are fixed may also vary.

Figure 35:
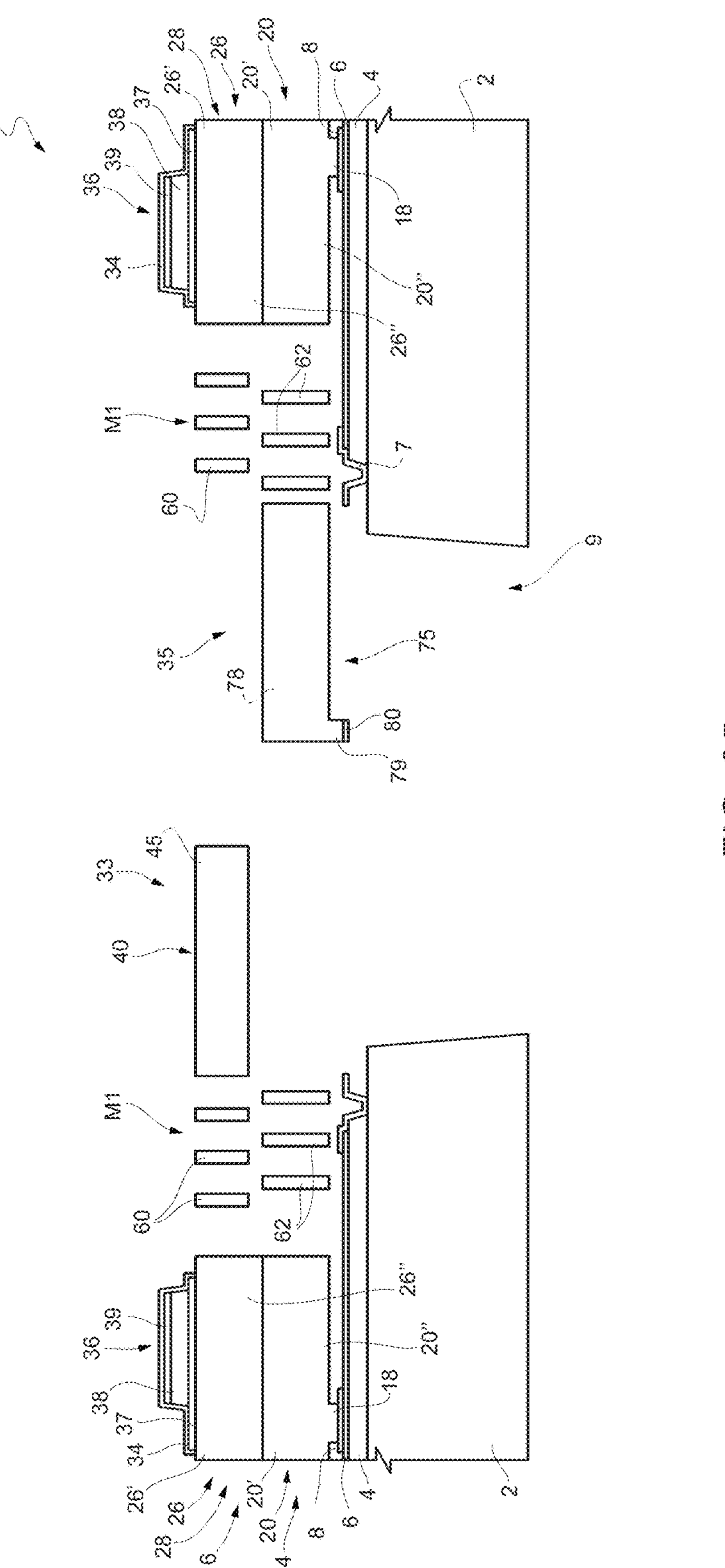
FIG. 35 is a schematic cross-sectional view of a variant of the MEMS shutter.

Finally, it is possible for the first shielding structures to be formed just by corresponding portions of the second semiconductor layer 16 and/or for the second shielding structures to be formed just by corresponding portions of the first semiconductor layer 14, as illustrated, for example, in FIG. 35, where, for instance, it is shown how each first shielding structure 33 is constituted by the main portion 45 of the top shielding region 40; further, each second shielding structure 45 is constituted by the bottom shielding region 75.

Likewise, also the coupling bodies 100 and the deformable coupling structures 59 may be formed just by portions of one of the first semiconductor layer 14 and the second semiconductor layer 16; further, the cantilever structures 29 may be formed just by the second semiconductor layer 16.

Finally, the presence of the conductive layer 7 is optional.

A MEMS shutter may be summarized as including a substrate (2) of semiconductor material traversed by a main aperture (9); a first semiconductor layer (14), arranged on top of the substrate (2); a second semiconductor layer (16), arranged on top of the first semiconductor layer (14) and forming, together with the first semiconductor layer (14), a supporting structure (28, 71, 87; 28, 171) fixed to the substrate (2); a plurality of deformable structures (29, 59, 68, 85; 169), each of which is formed by a corresponding portion of at least one of the first and second semiconductor layers; a plurality of actuators (36; 96); and a plurality of shielding structures (33; 35; 333; 335; 433), each of which is formed by a corresponding portion of at least one of the first and second semiconductor layers, the shielding structures being arranged angularly around the underlying main aperture so as to form a shielding of the main aperture, each shielding structure being further mechanically coupled to the supporting structure via a corresponding deformable structure; and wherein each actuator is electrically controllable so as to cause a translation of a corresponding shielding structure between a respective first position and a respective second position, thereby varying the shielding of the main aperture; and wherein said first and second positions of the shielding structures are such that, in at least one operating condition of the MEMS shutter (1), pairs of adjacent shielding structures at least partially overlap one another.

Said plurality of shielding structures (33; 35; 333; 335; 433) may include a plurality of first shielding structures (33; 333) and a plurality of second shielding structures (35; 335), which are arranged angularly alternating, each first shielding structure may include a respective top structure (40; 340), formed by the second semiconductor layer (16), each second shielding structure may include a respective bottom structure (75; 375), formed by the first semiconductor layer (14); and wherein, when the MEMS shutter (1) may be in said at least one operating condition, the top structure of each first shielding structure partially overlaps the bottom structures of the adjacent second shielding structures.

Each first shielding structure (33; 333) may further include a respective bottom structure (42; 342), formed by the first semiconductor layer (14), the respective top structure (40; 340) may include at least one projecting part (45; 345), which projects laterally with respect to said respective bottom structure (42; 342); and each second shielding structure (35; 335) may include a respective top structure (77; 377), which may be formed by the second semiconductor layer (16) and leaves exposed a part (78; 378) of the corresponding bottom structure (75; 375); and, when the MEMS shutter (1) is in said at least one operating condition, the projecting part of the top structure of each first shielding structure may overlie at least partially the exposed parts of the bottom structures of the adjacent second shielding structures.

When the MEMS shutter (1) is in said at least one operating condition, the projecting parts (45; 345) of the top structures (40; 340) of the first shielding structures (33; 333) and the exposed parts (78; 378) of the bottom structures (75; 375) of the second shielding regions (35; 335) may overlie at least in part the main aperture (9).

The top structure (40; 340) of each first shielding structure (33; 333) may include a top secondary portion (46; 346), fixed with respect to the corresponding underlying bottom structure (42; 342), and a top main portion (45; 345), which extends in cantilever fashion with respect to the top secondary portion and forms said projecting part (45; 345); and the bottom structure (42; 342) of each second shielding structure (35; 335) may include a bottom main portion (78; 378), which may be fixed with respect to the corresponding overlying top structure (77; 377) and may form said exposed part of the bottom structure.

The top main portions (45; 345) and the bottom main portions (78; 378) may be elongated parallel to corresponding directions (R; R'); and each actuator (36; 96) may be electrically controllable so as to translate the corresponding first shielding structure (33; 333) or the corresponding second shielding structure (35; 335) parallel to the respective direction.

Said directions (R) may be radial directions.

Said directions (R') may be co-planar and equidistant from an axis of symmetry (H) of the main aperture (9).

The shielding structures (433) each may include a respective top structure (440), formed by the second semiconductor layer (16), and a respective bottom structure (442), formed by the first semiconductor layer (14); and, when the MEMS shutter (1) is in said at least one operating condition, the top structure of each shielding structure may partially overlap the bottom structure of an adjacent shielding structure.

The top structure (440) of each shielding structure (433) may include a projecting part (481"), which projects laterally with respect to the corresponding bottom structure (442), and leaves exposed a part (448") of the corresponding bottom structure (442); and, when the MEMS shutter (1) is in said at least one operating condition, the projecting part of the top structure of each shielding structure may partially overlap the exposed part of the bottom structure of the adjacent shielding structure.

Each deformable structure (29, 59, 69, 85) may include a cantilever structure (29), fixed to the supporting structure (28, 71, 87); and a deformable coupling structure (59), which has its ends fixed to the cantilever structure and to the corresponding shielding structure (33; 35; 333; 335; 433) and is compliant in a direction parallel to an axis (Z) perpendicular to the substrate (2) and in a direction parallel to a respective structure direction (R; R'), which is perpendicular to said axis (Z); and a constraint structure (69, 85), which mechanically couples the shielding structure to the supporting structure, is rigid along said axis (Z) and is compliant in a plane (XY) perpendicular to said axis (Z); and each actuator (36) may be of a piezoelectric type, may be coupled to a corresponding cantilever structure (29) and may be electrically controllable so as to cause a translation along said axis (Z) of the corresponding cantilever structure (29) and a consequent deformation of the corresponding deformable coupling structure (59), which drags the corresponding shielding structure in a direction parallel to the respective structure direction (R; R').

Each deformable coupling structure (59) may include at least one elongated elastic structure (L1), which, in resting conditions, extends in a transverse direction (TR), which may be perpendicular to said axis (Z) and to the respective structure direction (R; R'), and may have, in a plane (ZR) parallel to said axis (Z) and to said respective structure direction (R; R'), a first principal axis of inertia (I1) and a second principal axis of inertia (12), each of which may be transverse with respect to said axis (Z) and to said respective structure direction (R; R'), so that movements along said axis (Z) of the end of each deformable coupling structure (59) fixed to the corresponding cantilever structure (29) may cause corresponding movements along the respective structure direction (R; R') of the end of the deformable coupling structure (59) fixed to the corresponding shielding structure (33; 35; 333; 335; 433).

Said actuators (96) may be of an electrostatic type and each may include at least one respective stator region (ST1), fixed with respect to the supporting structure (28, 169, 171) and formed by portions of the first and second semiconductor layers (14, 16); and at least one respective rotor region (100), formed by a corresponding portion of at least one of the first and second semiconductor layers and fixed with respect to the corresponding shielding structure (33), the actuator being electrically controllable so as to translate the rotor region and the corresponding shielding structure in a direction parallel to a respective structure direction (R); said MEMS shutter may further include, for each shielding structure, a corresponding constraint structure (169), which mechanically couples the shielding structure to the supporting structure, is rigid in a direction parallel to an axis (Z) perpendicular to the substrate (2) and is compliant in a plane (XY) perpendicular to said axis (Z).

The first and second semiconductor layers (14, 16) may be made of polysilicon.

A process for manufacturing a MEMS shutter (1), may be summarized as including forming a first semiconductor layer (14) on top of a substrate (2) of semiconductor material; forming on top of the first semiconductor layer (14) a second semiconductor layer (16), which forms, with the first semiconductor layer (14), a supporting structure (28, 71, 87; 28, 171) fixed to the substrate (2); forming a plurality of deformable structures (29, 59, 69, 85; 169), each of which is formed by a corresponding portion of at least one of the first and second semiconductor layers; forming a main aperture (9) through the substrate; forming a plurality of actuators (36; 96); and forming a plurality of shielding structures (33; 35; 333; 335; 433), each of which is formed by a corresponding portion of at least one of the first and second semiconductor layers, the shielding structures being arranged angularly around the underlying main aperture so as to form a shielding of the main aperture, each shielding structure being further mechanically coupled to the supporting structure via a corresponding deformable structure; and wherein each actuator is electrically controllable so as to cause a translation of a corresponding shielding structure between a respective first position and a respective second position, thereby varying the shielding of the main aperture; and wherein said first and second positions of the shielding structures are such that, in at least one operating condition of the MEMS shutter (1), pairs of adjacent shielding structures at least partially overlap one another.

The manufacturing process of a MEMS shutter (1) may include forming on the substrate (2) a layered region (504, 506) of dielectric material; selectively removing portions of the layered region (504, 506) and exposing a portion of the substrate (2); forming on the exposed portion of the substrate (2) an intermediate conductive region (510); forming a first sacrificial dielectric region (515) on the layered region (504, 506) and on the intermediate conductive region (510); selectively removing portions of the first sacrificial dielectric region (515) so as to expose the intermediate conductive region (510); forming the first semiconductor layer (14) on the first sacrificial dielectric region (515) and on the intermediate conductive region (510); forming a second sacrificial dielectric region (525) on the first semiconductor layer (14) so that it overlies at a distance at least part of the intermediate conductive region (510); forming the second semiconductor layer (16) on the second sacrificial dielectric region (525); and selectively removing portions of the second semiconductor layer (16) so as to form top openings (530) that traverse the second semiconductor layer (16) and laterally delimit at least in part the shielding structures (33); and forming the main aperture (9) may include selectively removing: portions of the substrate (2) arranged in contact with the intermediate conductive region (510); the intermediate conductive region (510); portions of the first semiconductor layer (14) that overlie the intermediate conductive region (510) and are overlaid by corresponding portions of the second sacrificial dielectric region (525), said corresponding portions of the second sacrificial dielectric region (525) being overlaid by corresponding portions (45) of the shielding structures (33); and portions of the substrate (2) that are laterally staggered with respect to the intermediate conductive region (510) and are delimited at the top by portions (504) of the layered region (504, 506) that are laterally staggered with respect to the intermediate conductive region (510), which are overlaid by corresponding portions of the first sacrificial dielectric region (515), said corresponding portions of the first sacrificial dielectric region (515) being overlaid by corresponding portions (78) of the shielding structures (35); said process may further include removing the first and second sacrificial dielectric regions (515, 525) and said portions of the layered region (504, 506) that are laterally staggered with respect to the intermediate conductive region (510) so as to release the shielding structures.

The manufacturing process may further include patterning the second sacrificial dielectric region (525) so as to expose portions of the first semiconductor layer (14); and forming the second semiconductor layer (16) so that it contacts the exposed portions of the first semiconductor layer (14).

The manufacturing process may further include, prior to forming the second sacrificial dielectric region (525), selectively removing portions of the first semiconductor layer (14) so as to form bottom openings (520) that delimit at least part of the deformable structures (62); and forming the second sacrificial dielectric region (525) may include forming the second sacrificial dielectric region (525) so that it extends within the bottom openings (520) until it comes into contact with the first sacrificial dielectric region (515).

Forming the layered region (504, 506) may include forming on the substrate (2) a first dielectric layer (504); and on the first dielectric layer (504), forming a second dielectric layer (506) resistant to a chemical agent; and selectively removing portions of the layered region (504, 506) may include selectively removing portions of the second dielectric layer (506) so as to expose a part of the first dielectric layer (504); and then removing portions of the exposed part of the first dielectric layer (504) so as to expose said portion of the substrate (2); and forming the first sacrificial dielectric region (515) may include forming the first sacrificial dielectric region (515) on portions of the exposed part of the first dielectric layer (504) that are laterally staggered with respect to the intermediate conductive region (510); and wherein said portions (504) of the layered region (504, 506) that are laterally staggered with respect to the intermediate conductive region (510) may include said portions of the exposed part of the first dielectric layer (504) that are laterally staggered with respect to the intermediate conductive region (510); and removing the first and second sacrificial dielectric regions (515, 525) and said portions of the layered region (504, 506) that are laterally staggered with respect to the intermediate conductive region (510) may include carrying out an etch with said chemical agent.

The manufacturing process may include forming, on the layered region (504, 506), conductive anchorage regions (8) that are laterally staggered with respect to the intermediate conductive region (510); and the step of forming the first sacrificial dielectric region (515) may include forming the first sacrificial dielectric region (515) on the conductive anchorage regions (8); said process may further include removing additional portions of the first sacrificial dielectric region (515) so as to expose the conductive anchorage regions (8); and forming the first semiconductor layer (14) may include forming the first semiconductor layer (14) on the conductive anchorage regions (8).

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A MEMS shutter, comprising:
- a substrate;
- a main aperture through the substrate;
- a first semiconductor layer on the substrate;
- a second semiconductor layer on the first semiconductor layer;
- a plurality of deformable structures, each being a portion of at least one of the first and second semiconductor layers;
- a plurality of actuators; and
- a plurality of shielding structures, each including a portion of at least one of the first and second semiconductor layers, the shielding structures being around the main aperture, each shielding structure being coupled to a corresponding deformable structure, pairs of adjacent shielding structures are configured to at least partially overlap one another in at least one operating condition, each of the plurality of deformable structures including:
- a cantilever structure; and
- a deformable coupling structure, which has its ends fixed to the cantilever structure and to a corresponding shielding structure and is compliant in a direction parallel to an axis perpendicular to the substrate and in a direction parallel to a respective structure direction, which is perpendicular to the axis,
  - the deformable coupling structure including at least one elongated elastic structure, which, in a resting condition, extends in a transverse direction, which is perpendicular to the axis and to the respective structure direction, and has, in a plane parallel to the axis and to the respective structure direction, a first principal axis of inertia and a second principal axis of inertia, each of which is transverse with respect to the axis and to the respective structure direction, so that movements along the axis of the end the deformable coupling structure fixed to the corresponding cantilever structure cause corresponding movements along the respective structure direction of the end of the deformable coupling structure fixed to the corresponding shielding structure; and
- a constraint structure coupled to the shielding structure and is rigid along the axis and is compliant in a plane perpendicular to the axis.

2. The MEMS shutter according to claim 1 wherein each actuator is electrically controllable to cause a translation of a corresponding shielding structure between a respective first position and a respective second position, thereby varying the shielding of the main aperture; said plurality of shielding structures comprises a plurality of first shielding structures and a plurality of second shielding structures, which are arranged angularly alternating, each first shielding structure comprising a respective top structure, of the second semiconductor layer, each second shielding structure comprising a respective bottom structure, of the first semiconductor layer; and wherein, when the MEMS shutter is in said at least one operating condition, the top structure of each first shielding structure partially overlaps the bottom structures of the adjacent second shielding structures.

3. The MEMS shutter according to claim 2 wherein each first shielding structure further comprises a respective bottom structure, formed by the first semiconductor layer, the respective top structure comprising at least one projecting part which projects laterally with respect to said respective bottom structure (42; 342); and wherein each second shielding structure comprises a respective top structure, which is formed by the second semiconductor layer and leaves exposed a part of the corresponding bottom structure; and wherein, when the MEMS shutter is in said at least one operating condition, the projecting part of the top structure of each first shielding structure overlies at least partially the exposed parts of the bottom structures of the adjacent second shielding structures.

4. The MEMS shutter according to claim 3 wherein, when the MEMS shutter is in said at least one operating condition, the projecting parts of the top structures of the first shielding structures and the exposed parts of the bottom structures of the second shielding regions overlie at least in part the main aperture.

5. The MEMS shutter according to claim 3 wherein the top structure of each first shielding structure comprises a top secondary portion, fixed with respect to the corresponding underlying bottom structure, and a top main portion, which extends in cantilever fashion with respect to the top secondary portion and forms said projecting part; and wherein the bottom structure of each second shielding structure comprises a bottom main portion, which is fixed with respect to the corresponding overlying top structure and forms said exposed part of the bottom structure.

6. The MEMS shutter according to claim 5 wherein the top main portions and the bottom main portions are elongated parallel to corresponding directions; and wherein each actuator is electrically controllable so as to translate the corresponding first shielding structure or the corresponding second shielding structure parallel to the respective direction.

7. The MEMS shutter according to claim 6 wherein said directions are radial directions.

8. The MEMS shutter according to claim 6 wherein said directions are co-planar and equidistant from an axis of symmetry of the main aperture.

9. The MEMS shutter according to claim 1 wherein the shielding structures each comprise a respective top structure, formed by the second semiconductor layer, and a respective bottom structure, formed by the first semiconductor layer; and wherein, when the MEMS shutter is in said at least one operating condition, the top structure of each shielding structure partially overlaps the bottom structure of an adjacent shielding structure.

10. The MEMS shutter according to claim 9 wherein the top structure of each shielding structure comprises a projecting part, which projects laterally with respect to the corresponding bottom structure, and leaves exposed a part of the corresponding bottom structure;
- and wherein, when the MEMS shutter is in said at least one operating condition, the projecting part of the top structure of each shielding structure partially overlaps the exposed part of the bottom structure of the adjacent shielding structure.

11. The MEMS shutter according to claim 1 wherein each actuator is of a piezoelectric type, is coupled to a corresponding cantilever structure and is electrically controllable so as to cause a translation along said axis of the corresponding cantilever structure and a consequent deformation of the corresponding deformable coupling structure, which drags the corresponding shielding structure in a direction parallel to the respective structure direction.

12. The MEMS shutter according to claim 1 wherein said actuators are of an electrostatic type and each comprise:

at least one respective stator region that includes portions of the first and second semiconductor layers; and at least one respective rotor region, formed by a corresponding portion of at least one of the first and second semiconductor layers and fixed with respect to the corresponding shielding structure, the actuator being electrically controllable so as to translate the rotor region and the corresponding shielding structure in the direction parallel to the respective structure direction;

said MEMS shutter further comprising, for each shielding structure, a corresponding constraint structure coupled to the shielding structure, is rigid in the direction parallel to the axis perpendicular to the substrate and is compliant in a plane perpendicular to said axis.

13. A device, comprising:

a micro-electromechanical shutter that includes:

a substrate;

an aperture through the substrate;

a first semiconductor layer on the substrate;

a second semiconductor layer on the first semiconductor layer;

a plurality of cantilever structures coupled to the substrate around the aperture;

a plurality of first shielding regions coupled to first ones of the plurality of cantilever structures by a plurality of first elastic structures; and a plurality of second shielding regions coupled to second ones of the plurality of cantilever structures by a plurality of second elastic structures, the plurality of second shielding regions being closer to the aperture than the plurality of first shielding regions, each of the plurality of cantilever structures including a respective first portion of the first semiconductor layer and a respective first portion of the second semiconductor layer directly overlying the respective first portion of the first semiconductor layer;

each of the plurality of first elastic structures and the plurality of second elastic structures including a respective second portion of the first semiconductor layer and a respective second portion of the second semiconductor layer directly overlying the respective second portion of the first semiconductor layer, and each of the plurality of first shielding regions and the plurality of second shielding regions including a respective third portion of the first semiconductor layer and a respective third portion of the second semiconductor layer directly overlying the respective third portion of the first semiconductor layer.

14. The device of claim 13 wherein adjacent ones of the plurality of first shielding regions are spaced from each other by one of the plurality of second shielding regions.

15. The device of claim 14, comprising a plurality of first spring structures between the plurality of first shielding regions and the corresponding cantilever structure and a plurality of second spring structures between the plurality of second shielding regions and the corresponding cantilever structure.

16. The device of claim 15 wherein the plurality of first shielding regions each include a first conductive projection toward the aperture.

17. The device of claim 16 wherein the plurality of second shielding regions each include a second conductive projection toward the aperture.

18. A device, comprising:

a substrate;

an aperture through the substrate;

a first semiconductor layer on the substrate;

a second semiconductor layer on the first semiconductor layer;

a plurality of cantilever structures on the substrate, each of the plurality of cantilever structures including a respective first portion of the first semiconductor layer and a respective first portion of the second semiconductor layer directly overlying the respective first portion of the first semiconductor layer;

a plurality of elastic structures coupled to the plurality of cantilever structures, respectively, each of the plurality of elastic structures including a respective second portion of the first semiconductor layer and a respective second portion of the second semiconductor layer directly overlying the respective second portion of the first semiconductor layer; and a plurality of shielding structures coupled to the plurality of elastic structures, respectively, each of the plurality of shielding structures including a respective third portion of the first semiconductor layer and a respective third portion of the second semiconductor layer directly overlying the respective third portion of the first semiconductor layer, the plurality of shielding structures overlapping the aperture.

19. The device of claim 18 wherein each of the plurality of shielding structures overlaps with another shielding structure of the plurality of shielding structures.

20. The device of claim 18 wherein the respective first portion of the first semiconductor layer is coupled to the respective third portion of the first semiconductor layer by the respective second portion of the first semiconductor layer, and the respective first portion of the second semiconductor layer is coupled to the respective third portion of the second semiconductor layer by the respective second portion of the second semiconductor layer.

21. The device of claim 18 wherein each of the plurality of elastic structures includes transverse portions that couples the respective second portion of the first semiconductor layer and the respective second portion of the semiconductor layer to each other.

22. The device of claim 18 where each of the plurality of shielding structures includes:

a main portion directly overlying the aperture;

a plurality of pillars on the substrate;

a plurality of springs coupled to the plurality of pillars, respectively, the main portion being coupled to the plurality of pillars by the plurality of springs.

* * * * *